US006601386B1

(12) United States Patent
Hori et al.

(10) Patent No.: US 6,601,386 B1
(45) Date of Patent: Aug. 5, 2003

(54) LEVER-OPERATED ACTUATOR DRIVE UNIT AND OPERATING LEVER UNIT

(75) Inventors: Shuuji Hori, Oyama (JP); Masayoshi Mototani, Oyama (JP); Mikio Nojiri, Hanyu (JP); Takeshi Endo, Kokubunji (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/497,768

(22) Filed: Feb. 4, 2000

(30) Foreign Application Priority Data

Feb. 10, 1999 (JP) .......................................... 11-033397

(51) Int. Cl.$^7$ ........................ F15B 13/042; F16K 35/02; G05G 1/04

(52) U.S. Cl. ......................... 60/443; 60/484; 137/636.2

(58) Field of Search .......................... 91/469, 470, 465, 91/170 R, 178, 182, 183, 188; 60/444, 443, 428, 486; 74/471 R, 473.1, 473.11; 137/636.2; 251/844; 180/6.48, 6.2

(56) References Cited

U.S. PATENT DOCUMENTS

| | | | | | |
|---|---|---|---|---|---|
| 3,496,796 | A | * | 2/1970 | Gunther Alpers et al. | 137/636.2 |
| 3,589,242 | A | * | 6/1971 | Peterson et al. | 91/523 |
| 3,672,161 | A | * | 6/1972 | Krusche et al. | 60/420 |
| 3,871,178 | A | * | 3/1975 | Tominaga | 60/443 |
| 3,992,979 | A | * | 11/1976 | Smith | 91/465 X |
| 4,019,321 | A | * | 4/1977 | Aoyama et al. | 60/484 |
| 4,076,090 | A | * | 2/1978 | Krusche et al. | 180/6.48 |
| 4,408,103 | A | * | 10/1983 | Smith, III | 200/17 R |
| 4,421,135 | A | * | 12/1983 | Harshman et al. | 91/465 X |
| 4,457,387 | A | * | 7/1984 | Taylor | 180/6.48 |
| 5,433,249 | A | * | 7/1995 | Tsubota et al. | 137/625.68 |
| 5,937,897 | A | * | 8/1999 | Chatterjea et al. | 137/554 |
| 6,435,289 | B1 | * | 8/2002 | Hori et al. | 180/6.3 |

* cited by examiner

*Primary Examiner*—Edward K. Look
*Assistant Examiner*—Igor Kershteyn
(74) *Attorney, Agent, or Firm*—Varndell & Varndell, PLLC

(57) ABSTRACT

An actuator drive unit in which either of two types of actuators and a drive direction thereof (either forward direction or backward direction) are corresponded to respective four pistons. When one of the four pistons in one of four displacement signal generating units generates a displacement signal, the actuator corresponding to the piston generating the displacement signal is driven in a corresponding drive direction, by an amount of drive corresponding to the displacement signal.

4 Claims, 13 Drawing Sheets

LEVER-OPERATED ACTUATOR DRIVE UNIT AND OPERATING LEVER UNIT

BACKGROUND OF THE INVENTION

1. Field of the Invention

The present invention relates to a lever-operated actuator drive unit and an operating lever unit and, more particularly to a lever-operated actuator drive unit which makes it possible to construct apparatuses readily and an operating lever unit which can be operated without a feeling of physical disorder, such as conventional operating lever units.

2. Description of the Related Art

There is a known invention regarding an operating lever unit. The operating lever unit generates operating signals by tilting operation of one operating lever and controls two hydraulic actuators on the basis of its operating signals.

Unexamined Japanese Patent Publication (kokai) No. 9-89515, for example, discloses an electric operating lever unit which outputs electrical signals corresponding to respective displacements of four pistons by tilting operation of one operating lever. Two hydraulic actuators can be drive-controlled on the basis of the electrical signals outputted from the electric operating lever unit.

Also, International Publication WO96/15374 discloses a hydraulic operating lever unit that outputs oil pressure signals.

FIG. 7(*a*) shows a main sectional view of the hydraulic operating lever unit which outputs oil pressure signals corresponding to respective displacements of four pistons by tilting operation of one operating lever. FIG. 7(*b*) shows a perspective view of the construction of a universal joint 50 shown in FIG. 7(*a*). Also, FIG. 8 shows an embodiment regarding an actuator drive unit control apparatus which controls the drive of two hydraulic motors mounted on a hydraulic driven vehicle, by the operating lever unit shown in FIG. 7. Further, FIGS. 12(*a*) and 12(*b*) show movements of the operating lever unit shown in FIG. 7. The above-mentioned unit will be explained with reference to these drawings.

An operating lever unit 5 shown in FIG. 7(*a*) is generally composed of a unit body 7 and an operating lever 6 tiltably provided onto the unit body 7.

The operating lever 6 is mounted to the unit body 7 via a universal joint 50 and a diskplate 8.

That is, the upper portion of the unit body 7 is provided with a mounting plate 11. Further, as shown in FIGS. 12(*a*) and 12(*b*), four pistons 1,2,3, and 4 are provided in such a way that tops (upper ends) of the pistons protrude beyond the mounting plate 11. The pistons 1,2,3, and 4 are arranged so as to locate on the four corners of a regular square, with viewed from upper side of the mounting plate 11. Besides, in place of the regular square, a quadrilateral may be applied. When the operating lever 6 is tilted in a direction F and the piston 4 is pushed down, the vehicle moves forward. Also, when the operating lever 6 is tilted in a direction B and the piston 2 is pushed down, the vehicle moves backward. Further, when the operating lever 6 is tilted in a direction R and the piston 1 is pushed down, the vehicle spins in the clocks direction (or does the right spin-turn). Furthermore, when the operating lever 6 is tilted in a direction L and the piston 3 is pushed down, the vehicle spins in the counter-clockwise direction (or does the left spin-turn). By the way, the spin-turn means that the vehicle turns without movement of the center of vehicle. More concretely speaking, the spin-turn means that a pair of wheels or endless tracks mounted to a vehicle rotate in the opposite directions to each other at the same speed whereby the vehicle turns.

FIG. 7(*a*) is a sectional view viewed from the left side of the operating lever unit shown in FIG. 12(*a*).

A forked bracket 12 is mounted to the mounting plate 11 of the unit body 7. As shown in FIG. 7(*b*), the forked bracket 12 is provided with a tilting piece 13, via a supporting shaft 10. The tilting piece 13 is provided with the operating lever 6, via a supporting shaft 9. That is, the operating lever 6 is mounted to the unit body 7 via the universal joint 50.

Both axes of the supporting shaft 9 and supporting shaft 10 are provided so as to be at right angles to each other.

The supporting shaft 9 is parallel to the upper side of mounting plate 11 and perpendicular to the paper surface. The supporting shaft 9 supports the operating lever 6 so as to make it be rotatable about the axis of supporting shaft 9. That is, the operating lever 6 rotates about the axis of supporting shaft 9, thereby being capable of tilting in left and right directions in FIG. 7(*a*).

The supporting shaft 10 is parallel to the upper side of mounting plate 11 and perpendicular to the supporting shaft 9. The supporting shaft 10 supports the tilting piece 13 relative to the forked bracket 12 so as to make the tiling piece 13 be rotatable about the axis of supporting shaft 10. That is, the operating lever 6, with the tilting piece 13, rotates about the axis of supporting shaft 10, thereby being capable of tilting in a direction perpendicular to the paper surface in FIG. 7(*a*).

As mentioned above, the universal joint 50 is composed, so that the operating lever 6 is capable of tilting relative to the unit body 7 in two directions perpendicular to each other.

The disk plate 8 is mounted to the operating lever 6 in such a way that tops (upper ends) of pistons 1,2,3, and 4 are in contact with the under surface of the disk plate 8.

Accordingly, the pistons 4 and 2 (and the pistons 1 and 3 as well, but not shown in FIG. 7) move in accordance with a tilting direction and an amount of tilting motion of the operating lever 6.

The unit body 7 is provided with oil pressure signal generating means which generates oil pressure signals corresponding to the amount of each displacement of each of four pistons 1,2,3, and 4.

FIG. 8 shows a hydraulic circuit of a conventional drive unit with the operating lever unit 5.

As shown in FIG. 8, the operating lever unit 5 is supplied with a pilot pressure oil from a fixed capacitive hydraulic pump 22. Also, the operating lever unit 5 is connected to a tank 23.

The pistons 4,2,1, and 3 are provided with pressure-reducing valves 18,19,20, and 21, via respective set springs.

Output ports of the pressure-reducing valves 18,19,20,21 are communicated with pilot lines 14,15,16, and 17.

Next, the operation of the operating lever unit 5 will now be explained.

FIG. 7(*a*) shows a situation wherein the operating lever 6 is in a neutral position. From this situation, when the operating lever 6 is tilted about the axis of supporting shaft 9 toward left side of FIG. 7(*a*), the piston 4 located on the left side of FIG. 7(*a*) is pushed down via the disk plate 8 in the direction of arrow A The stroke S (displacement) of the piston 4 becomes a magnitude corresponding to the amount of tilting motion of the operating lever 6.

When the piston 4 is pushed down, the opening area of the pressure-reducing valve 18 becomes larger through the set spring and then, the pilot pressure is outputted to the pilot line 14. The pressure of pilot pressure outputted acts on the pressure-reducing valve 18 so as to reduce the opening area thereof. The pilot pressure compresses the set spring, so that the pressure-reducing valve 18 is balanced between the spring force and the pilot pressure. The spring force at the balanced position corresponds to the stroke S and the pilot pressure becomes pressure corresponding to the opening area Therefore, the pilot pressure Pp which is outputted from the pilot line 14 becomes an amount corresponding to the amount of tilting motion of the operating lever 6.

FIG. 14 shows a relationship between the stroke S of operating lever 6 and the pilot pressure Pp. When the operating lever 6 is operated and the piston 4 moves from a stroke position SO corresponding to the neutral position shown in FIG. 7(*a*) to a position SF whereat the maximum power Ppmax is outputted, the pilot pressure Pp outputted from the pilot line 14 changes from a drain pressure Pp0 in the tank 23 to a discharge pressure Ppmax of the fixed capacitive hydraulic pump 22. When the piston 4 arrives at the position SF where the maximum power Ppmax is outputted, the operating lever 6 is positioned at a stroke end, thereby being prevented from moving beyond that.

The above-mentioned explanation is about the case that the piston 4 moves according to tilting motion of the operating lever 6 and oil pressure signal representing the pilot pressure Pp is outputted from the pilot line 14. It is explained equally in case that the pistons 2,1, and 3 move respectively according to tilting motions of the operating lever 6 and oil pressure signals representing the pilot pressures Pp are outputted from the pilot lines 15,16, and 17.

Next, the control of movement of a vehicle by operation of the operating lever 6 will be now explained.

The vehicle shown in FIG. 8 has a left endless track 36 and a right endless track 38 at left and right sides of its body.

The left endless track 36 and right endless track 38 travel by respectively driving a hydraulic motor 35 for left traveling and a hydraulic motor 37 for right traveling. That is, the hydraulic motor 35 is an actuator for making the left endless track 36 run in forward and backward directions namely in two directions. Also, the hydraulic motor 37 is an actuator for making the right endless track 38 run in forward and backward directions namely in two directions.

The operating lever unit 5 is connected to respective swash plate-controlling cylinders 30, 31 of left and right variable capacitive hydraulic pumps 33, 34, through a drive signal generating circuit 29. Further, the left and right variable capacitive hydraulic pumps 33, 34 are connected to the left and right hydraulic motors 35,37 through oil pressure lines.

The drive signal generating circuit 29 is composed of respective shuttle valves 25,26,27, and 28, which output signals corresponding to higher pressure as compared between oil pressure signals outputted from two pistons adjacent to each other in the square (a dot-dash line) shown in FIG. 13.

The pilot line 14 is connected to an inlet port F of shuttle valves 25 and 26. The pilot line 15 is connected to an inlet port B of shuttle valves 27 and 28. The pilot line 16 is connected to an inlet port R of shuttle valves 26 and 27. The pilot line 17 is connected to an inlet port L of shuttle valves 25 and 28.

The outlet port of the shuttle valve 25 is connected to a cylinder chamber 31F of the swash plate-controlling cylinder 31. Also, the outlet port of the shuttle valve 26 is connected to a cylinder chamber 30F of the swash plate-controlling cylinder 30. Further, the outlet port of the shuttle valve 27 is connected to the cylinder chamber 31B of the swash plate-controlling cylinder 31. Furthermore, the outlet port of the shuttle valve 28 is connected to a cylinder chamber 30B of the swash plate-controlling cylinder 30.

The variable capacitive hydraulic pumps 33, 34 and fixed capacitive hydraulic pump 22 are driven by an engine 32.

Thus, the left and right hydraulic motors 35,37 are driven according to pressures corresponding to oil pressure signals Pp generated by the operating lever unit 5. Therefore, the left and right hydraulic motors 35,37 are driven in the direction of rotation in accordance with tilting direction of the operating lever 6 and are driven at a speed in accordance with amount of tilting motion of the operating lever 6, whereby the left and right endless tracks 36,38 can be driven respectively.

FIG. 10 is a diagram for explaining the motion of a vehicle on which the hydraulic circuit shown in FIG. 8 is mounted, with correspondence to tilting direction of the operating lever 6. Hereinafter, with reference to FIG. 10, the operation of hydraulic circuit shown in FIG. 8 will now be explained.

First, it is assumed that the operating lever 6 has been tilted in the forward direction F from the neutral position, as shown in FIG. 10.

Under the situation, in the operating lever unit 5, only the piston 4 moves. Accordingly, only the pilot line 14 outputs an oil pressure signal Pp. The oil pressure signal Pp is fed into the drive signal generating circuit 29 and is inputted to shuttle valves 25,26. Thereupon, since the pilot pressure dose not act on the inlet ports L and R, the shuttle valves 25,26 output the ail pressure signal Pp. The shuttle valve 25 outputs a drive signal (pilot pressure) corresponding to a forward direction of the hydraulic motor 37 and the pilot pressure oil is supplied to the cylinder chamber 31F corresponding to right forward traveling of the swash plate-controlling cylinder 31. Also, The shuttle valve 26 of the drive signal generating circuit 29 outputs a drive signal (pilot pressure) corresponding to the forward direction of the hydraulic motor 35 and the outputted pressure oil is supplied to the cylinder chamber 30F corresponding to left forward traveling of the swash plate-controlling cylinder 30.

Therefore, the swash plate of the right traveling hydraulic pump 34 is changed to a tilt-rotating angle corresponding to forward traveling, and the pressurized oil discharged from the right traveling hydraulic pump 34 flows into the inflow port corresponding to forward traveling side of the hydraulic motor 37 for right traveling. The swash plate of the left traveling hydraulic pump 33 is changed to a tilt-rotating angle corresponding to forward traveling, and the pressurized oil discharged from the left traveling hydraulic pump 33 flows into the inflow port corresponding to forward traveling side of the hydraulic motor 35 for left traveling. The pressures which are outputted from shuttle valves 25,26 are the same. The pressures which are outputted from the left and right traveling hydraulic pumps 33,34 become the same and, the pressures which flow into the hydraulic motors 35,37 for left and right traveling become the same. Accordingly, the hydraulic motors 35,37 for left and right traveling rotate at the same speed.

Thus, the left and right endless tracks 36,38 operate in the forward direction at the same speed, whereby the vehicle travels forward (goes straight on) as shown by the arrow in FIG. 10.

In FIG. 10, when the operating lever 6 tilted in the backward direction B, the vehicle, likewise, travels backward (i.e. goes straight on). Also, when the operating lever 6 is tilted in the right spin-turn (i.e. the right turning without movement of the center of vehicle) direction R the vehicle travels in like manner. Further, when the operating lever 6 is tilted in the left spin-turn (i.e. the left turning without movement of the center of vehicle) direction L, the vehicle travels in like manner. Furthermore, when the operating lever 6 is tilted in a middle direction between the direction F and the direction R, between the direction R and the direction B, between the direction B and the direction L, or between the direction L and the direction F the vehicle travels in like manner.

That is, respective shuttle valves 25 to 28 of the drive signal generating circuit 29 output drive signals corresponding to lever-tilting directions and the drive signals are inputted to cylinder chambers of corresponding swash plate-controlling cylinders 30,31, whereby the left and right endless tracks 36,38 operate according to lever-tilting direction, through left and right hydraulic pumps 33,34 and left and right hydraulic motors 35,37. Besides, the speed of vehicle becomes a magnitude corresponding to the amount of tilting motion of the operating lever 6.

Thus, in accordance with tilting motion of the operating lever 6 in the backward direction B, the vehicle travels backward (i.e. goes straight on), as shown by the arrow in FIG. 10. Also, in accordance with tilting motion of the operating lever 6 in the right spin-turn (i.e. the right turning without movement of the center of vehicle) direction R, the vehicle spins in the clockwise direction (i.e. does the right spin-turn). In accordance with tilting motion of the operating lever 6 in the left spin-turn (i.e. the left turning without movement of the center of vehicle) direction L, the vehicle spins in the counterclockwise direction (i.e. does the left spin-turn). Further, in accordance with tilting motion of the operating lever 6 in the middle direction between the direction F and the direction R, the vehicle turns in the right direction while traveling forward In accordance with tilting motion of the operating lever 6 in the middle direction between the direction R and the direction B, the vehicle turns in the right direction while traveling backward. Furthermore, in accordance with tilting motion of the operating lever 6 in the middle direction between the direction B and the direction L, the vehicle turns in the left direction while traveling backward. In accordance with tilting motion of the operating lever 6 in the middle direction between the direction L and the direction F, the vehicle turns in the left direction while traveling forward.

The above explanation is about a vehicle with endless tracks. However, a vehicle which has respective two wheels at left and right sides can be explained in like manner. In case of the vehicle with wheels, the hydraulic motor for traveling is exchanged to a steering motor, and the wheels are driven via gears or chains.

The hydraulic drive unit shown in FIG. 8 is mainly mounted on vehicles such as a skid steer loader and the like.

Next, FIG. 9 shows a hydraulic drive unit, which is mainly mounted on vehicles such as a bulldozer and the like.

In FIG. 9, elements that are identical with corresponding elements in FIG. 8 are given the same reference numbers and therefore explanation about those elements is omitted. The operation pattern by the operating lever 6 about vehicles such as bulldozer and the like is different from that about vehicles such as skid steer loader and the like. For this reason, the connected configuration of oil pressure lines between the drive signal generating circuit 29 and the swash plate-controlling cylinders 30,31 about the former vehicles is different in part from that about the latter The operation pattern is shown in FIG. 11.

The difference between hydraulic circuits shown in FIG. 8 and 9 is as follows. That is, with respect to the hydraulic circuit shown in FIG. 9, the outlet port of shuttle valve 25 is connected to the cylinder chamber 30F of swash plate-controlling cylinder 30. Also, the outlet port of shuttle valve 26 is connected to the cylinder chamber 31F of swash plate-controlling cylinder 31.

Accordingly, in accordance with tilting motion of the operating lever 6 in the forward direction F, the vehicle travels forward (i.e. goes straight on), as shown by the arrow in FIG. 11. In accordance with tilting motion of the operating lever 6 in the backward direction B, the vehicle travels backward (i.e. goes straight on). Also, when the operating lever 6 is tilted in the right direction R, the vehicle stops. When the operating lever 6 is tilted in the left direction L, the vehicle stops. Further, in accordance with tilting motion of the operating lever 6 in a middle direction between the direction F and the direction R, the vehicle turns in the right direction while traveling forward. Also, in accordance with tilting motion of the operating lever 6 in a middle direction between the direction R and the direction B, the vehicle turns in the left direction while traveling backward. Furthermore, in accordance with tilting motion of the operating lever 6 in a middle direction between the direction B and the direction L, the vehicle turns in the right direction while traveling backward. Also, in accordance with tilting motion of the operating lever 6 in a middle direction between the direction L and the direction F the vehicle turns in the left direction while traveling forward.

As shown in FIGS. 8 and 9, since lever displacement signals Pp generated by the operating lever unit 5 are converted into drive signals signifying either of left and right hydraulic motors 33, and 34 deft or right) and rotation directions (traveling forward or backward) of the hydraulic motors 33, and 34, the conventional hydraulic drive unit has the drive signal generating circuit 29.

For this reason, the number of parts composing the hydraulic circuit increases, and therefore the hydraulic drive unit can not be formed simply.

A first object of the present invention is to disuse the drive signal generating circuit 29 and to make an actuator drive unit simply.

The conventional operating lever unit 5 shown in FIG. 12 is made in such a way that when the operating lever 6 is tilted in the forward direction F, only the one piston 4 is pushed down.

In this arrangement, when the operator operates so as to shift tilting direction of the operating lever 6 while keeping full stroke condition from the condition wherein the operating lever 6 is tilted up to the full stroke position in the forward direction F, the locus of the tip end of operating lever 6 (i.e. of the knob of operating lever 6) is shown as the dot-dash line in FIG. 13. Namely, the operator operates the operating lever 6 with having an operation feeling such manner as to move the top of operating lever 6 along a regular square. In other words, the conventional operating lever unit 5 gives the operator an operation feeling such that the operator can move it from a forward position F to a lateral direction.

Next, FIG. 15(*b*) shows another case wherein the operating lever 6 is mounted to the unit body 7 (mounting plate 11) of the conventional operating lever unit 5 with a setting angle different from that in FIG. 12.

FIGS. 15(*a*) and 15(*b*) are diagrams corresponding to FIGS. 12(*a*) and 12(*b*). In the operating lever unit 5 shown in FIG. 15, the operating lever 6 is mounted to the unit body 7 (mounting plate 11) with a setting angle dislocated 450 relative to that in FIG. 12.

In the operating lever unit 5 shown in FIG. 15, when the operating lever 6 is tilted in the forward direction F, two pistons 1,4 are simultaneously pushed down.

In this arrangement, when the operator operates so as to shift tilting direction of the operating lever 6 while keeping fill stroke condition from the condition wherein the operating lever 6 is tilted up to the full stroke position in the forward direction F, the locus of the tip end of operating lever 6 (i.e. of the knob of operating lever 6) is shown as a dot-dash line in FIG. 16(*a*). Namely, the operator operates the operating lever 6 with having an operation feeling such manner as to move the tip end of operating lever 6 along a rhomb.

In other words, the operating lever 6 gives the operator an operation feeling such that the operator pulls back it from the forward position F, but does not give the operator the above operation feeling such that the operator can move it in a lateral direction. Thus, the operating lever 6 gives the operator, who is familiar with operation feeling about the conventional operating lever 6, a feeling of physical disorder. This reason can be explained with reference to FIGS. 17 and 18.

FIGS. 17 and 18 show the condition wherein the operating lever 6 is at a stroke end after tilted in the forward direction F.

FIGS. 17(*a*) and 17(*b*) show the condition wherein the disk plate 8 tilted with the operating lever 6 is pushing down one piston 4. FIG. 17(*b*) is a plan view as seen from the direction Z in FIG. 17(*a*). The supporting point of tilting motion of the operating lever 6 is shown as a reference number 6*a*. The supporting point 6*a* is stationary and is not shift regardless of tilting motion of the operating lever 6.

The line which joins the point whereat the piston 4 arrived at the stroke end is in contact with the disk plate 8 to the supporting point 6*a* of the operating lever 6 is considered as X axis. The line which is perpendicular to X axis and which joins the point whereat the piston 3 is in contact with the disk plate 8 to the supporting point 6*a* of the operating lever 6 is considered as Y axis.

The disk plate 8 can be tilted about X axis as a supporting axis, as shown by the arrow C. In other words, the operating lever 6 also can be tilted in the direction of Y axis while keeping tilted angle thereof in the direction of X axis. Accordingly, the operation feeling such that the operating lever 6 can be shifted from a forward position F to a lateral direction can be obtained.

Likewise, for example, under condition wherein only the piston 1 is pushed down, that is, only the piston 1 is at the stroke end, the operating lever 6 also can be tilted about Y axis as a supporting axis in the direction of X axis while keeping tilted angle thereof in the direction of Y axis.

Therefore, the operation feeling such as to shift the tip end of operating lever 6 along a regular square is obtained (See FIG. 13).

On the other hand, FIGS. 18(*a*) and 18(*b*) show a condition wherein the disk plate 8 tilted with the operating lever 6 is pushing down two pistons 1,4 simultaneously.

Since the operating lever 6 is attached to the unit body 7 (mounting plate 11) with a setting angle of 45° dislocated, in a lever operating direction namely in the forward direction F and in the backward direction R, the locus of the tip end of operating lever 6 rotates through 45°. This is shown in FIG. 16(*a*). That is, the operator is to operate the operating lever 6 with operation feeling such manner as to shift the tip end of operating lever 6 along a rhomb. In other words, the operator does not get the operation feeling such as to shift it from a forward position F to a lateral direction.

A second object of the present invention is to obtain an operation feeling of an operating lever such as the conventional operation feeling, no matter what the operating lever pushes down two pistons simultaneously.

Further, a third object of the present invention is to achieve the first and second objects all together.

SUMMARY OF THE INVENTION

To achieve the above-mentioned first object, a first aspect of the present invention is a lever-operated actuator drive unit which comprises four pistons moving according to tilting directions and amounts of tilting motions of an operating lever, displacement signal generating means for generating displacement signals of magnitudes corresponding to respective displacements of the four pistons and, two types of actuators drivenable in two drive directions of normal and reverse directions, and which drives the two types of actuators in drive directions corresponding to tilting directions of the operating lever, by amounts of drive corresponding to amounts of tilting motions of the operating lever, on the basis of the displacement signals generated by the displacement signal generating means, wherein:

either of the two types of actuators and a drive direction thereof are being corresponded to the respective four pistons; and when one of the four pistons in the displacement signal generating means generates a displacement signal, the actuator corresponding to the piston generating the displacement signal is driven in a corresponding direction by an amount of drive corresponding to the displacement signal.

The first aspect of the present invention will be explained with reference to FIGS. 1(*a*) and 1(*b*).

According to the first aspect of the present invention, either of the two types of actuators 35, 37 (either the actuator 35 or the actuator 37) and drive direction thereof (either forward direction or backward direction) are corresponded to respective four pistons 1,2,3, 4.

Thereupon, when one of the four pistons 1,2,3,4 in displacement signal generating means 20,19,21,18 generates a displacement signal, the actuator corresponding to the piston generating the displacement signal is driven in a corresponding direction by the amount of drive corresponding to the displacement signal That is, when the piston 1 generates a displacement signal, the actuator 35 corresponding to the piston 1 which generates the displacement signal is driven, in the corresponding drive direction (in the forward direction), by the amount of drive corresponding to the displacement signal. Also, when the piston 2 generates a displacement signal the actuator 37 corresponding to the piston 2 which generates the displacement signal is driven, in a corresponding drive direction (in the backward direction), by the amount of drive corresponding to the displacement signal. Further, when the piston 3 generates a displacement signal the actuator 35 corresponding to the piston 3 which generates the displacement signal is driven, in a corresponding drive direction (in the backward direction), by the amount of drive corresponding to the displacement signal. Furthermore, when the piston 4 generates a displacement signal, the actuator 37 corresponding to the piston 4 which generates the displacement signal is driven, in a corresponding drive direction (in the forward direction), by the amount of drive corresponding to the displacement signal.

As described above, according to the first aspect of the present invention, displacement signals which are generated by displacement signal generating means 20,19,21,18 are directly outputted to two actuators 35,37 as drive signals. Therefore, the drive signal generating circuit 29 which is indispensable on the conventional hydraulic drive unit shown in FIGS. 8 and 9 becomes needless.

For this reason, it is possible to decrease the number of parts comprising an actuator drive unit and therefore it is possible to construct an actuator drive unit simply.

Also, to achieve the above-mentioned first object, a second aspect of the present invention is a lever-operated actuator drive unit which comprises four pistons respectively arranged at a right above position, a right below position, a left below position and a left above position and moving according to tilting directions and amounts of tilting motions of an operating lever, displacement signal generating means for generating displacement signals of magnitudes corresponding to respective displacements of the four pistons, and a right traveling actuator drivenable in two running directions of forward and backward, a left traveling actuator drivenable in two running directions of forward and backward, and which drives the light traveling actuator and the left traveling actuator in running directions corresponding to tilting directions of the operating lever, by amounts of drive corresponding to amounts of tilting motions of the operating lever, on the basis of the displacement signals generated by the displacement signal generating means, thereby making a right traveling mechanism and a left traveling mechanism of a vehicle operate, wherein:

a forward direction of the left traveling actuator is being corresponded to the piston arranged at the right above position, a backward direction of the right traveling actuator is being corresponded to the piston arranged at the right below position, a backward direction of the left traveling actuator is being corresponded to the piston arranged at the left below position, and a forward direction of the right traveling actuator is being corresponded to the piston arranged at the left above position; and when one of the four pistons in the displacement signal generating means generates a displacement signal, the traveling actuator corresponding to the piston generating the displacement signal is driven in a corresponding running direction, by an amount of drive corresponding to the displacement signal.

The second aspect of the present invention will be explained with reference to FIGS. 1(*a*) and 1(*b*).

According to the second aspect of the present invention, the forward direction of the left traveling actuator 35 is corresponded to the piston 1 arranged at the right above position, the backward direction of the right traveling actuator 37 is corresponded to the piston 2 arranged at the right below position, the backward direction of the left traveling actuator 35 is corresponded to the piston 3 arranged at the left below position, and the forward direction of the right traveling actuator 37 is corresponded to the piston 4 arranged at the left above position. Thereupon, when one of the four pistons 1,2,3,4 in the displacement signal generating means 20,19,21,18 generates a displacement signal, the traveling actuator corresponding to the piston generating the displacement signal is driven in a corresponding running direction by the amount of drive corresponding to the displacement signal. That is, when the piston 1 generates a displacement signal, the left traveling actuator 35 corresponding to the piston 1 which generates the displacement signal is driven, in a corresponding forward direction, by the amount of drive corresponding to the displacement signal. Also, when the piston 2 generates a displacement signal, the right traveling actuator 37 corresponding to the piston 2 which generates the displacement signal is driven, in a corresponding backward direction, by the amount of drive corresponding to the displacement signal. Further, when the piston 3 generates a displacement signal, the left traveling actuator 35 corresponding to the piston 3 which generates the displacement signal is driven, in a corresponding backward direction, by the amount of drive corresponding to the displacement signal. Furthermore, when the piston 4 generates a displacement signal, the right traveling actuator 37 corresponding to the piston 4 which generates the displacement signal is driven, in the corresponding forward direction, by the amount of drive corresponding to the displacement signal.

As described above, according to the second aspect of the present invention, displacement signals which are generated by the displacement signal generating means 20,19,21,18 are directly outputted to two traveling actuators 35,37 as drive signals. Therefore, the drive signal generating circuit 29 which is indispensable on the conventional hydraulic drive unit shown in FIGS. 8 and 9 becomes needless.

For this reason, it is possible to decrease the number of parts comprising an actuator drive unit and therefore it is possible to construct an actuator drive unit simply. The second aspect of the present invention can be applied to vehicles such as a skid steer loader and the like.

Also, to achieve the above-mentioned first object, a third aspect of the present invention is a lever-operated actuator drive unit which comprises four pistons respectively arranged at a right above position, a right below position, a left below position and a left above position and moving according to tilting directions and amounts of tilting motions of an operating lever, displacement signal generating means for generating displacement signals of magnitudes corresponding to respective displacements of the four pistons, and a right traveling actuator drivenable in two running directions of forward and backward, a left traveling actuator drivenable in two running directions of forward and backward, and which drives the right traveling actuator and the left traveling actuator in running directions corresponding to tilting directions of the operating lever, by amounts of drive corresponding to amounts of tilting motions of the operating lever, on the basis of the displacement signals generated by the displacement signal generating means, thereby making a right traveling mechanism and a left traveling mechanism of a vehicle operate, wherein:

a forward direction of the left traveling actuator is being corresponded to the piston arranged at the right above position, a backward direction of the left traveling actuator is being corresponded to the piston arranged at the right below position, a backward direction of the right traveling actuator is being corresponded to the piston arranged at the left below position, and a forward direction of the right traveling actuator is being corresponded to the piston arranged at the left above position; and when one of the four pistons in the displacement signal generating means generates a displacement signal, the traveling actuator corresponding to the piston generating the displacement signal is driven in a corresponding running direction, by an amount of drive corresponding to the displacement signal.

The third aspect of the present invention will be explained with reference to FIGS. 2(*a*) and 2(*b*).

According to the third aspect of the present invention, the forward direction of the left traveling actuator 35 is corresponded to the piston 1 arranged at the right above position, the backward direction of the left traveling actuator 35 is corresponded to the piston 2 arranged at the right below position, the backward direction of the right traveling actuator 37 is corresponded to the piston 3 arranged at the left below position, and the forward direction of the right traveling actuator 37 is corresponded to the piston 4 arranged at the left above position. Thereupon, when one of the four pistons 1,2,3,4 in the displacement signal generating means 20,19,21,18 generates a displacement signal, the traveling actuator corresponding to the piston generating the displacement signal is driven in a corresponding running direction by the amount of drive corresponding to the displacement signal. That is, when the piston 1 generates a displacement signal the left traveling actuator 35 corresponding to the piston 1 which generates the displacement signal is driven, in a corresponding forward direction, by the amount of drive corresponding to the displacement signal. Also, when the piston 2 generates a displacement signal, the left traveling actuator 35 corresponding to the piston 2 which generates the displacement signal is driven, in a corresponding backward direction, by the amount of drive corresponding to the displacement signal. Further, when the piston 3 generates a displacement signal, the right traveling actuator 37 corresponding to the piston 3 which generates the displacement signal is driven, in a corresponding backward direction, by the amount of drive corresponding to the displacement signal. Furthermore, when the piston 4 generates a displacement signal, the right traveling actuator 37 corresponding to the piston 4 which generates the displacement signal is driven, in a corresponding forward direction, by the amount of drive corresponding to the displacement signal.

As described above, according to the third aspect of the present invention, displacement signals which are generated by the displacement signal generating means 20,19,21,18 are directly outputted to two traveling actuators 35,37 as drive signals. Therefore, the drive signal generating circuit 29 which is indispensable on the conventional hydraulic drive unit shown in FIGS. 8 and 9 becomes needless.

For this reason, it is possible to decrease the number of parts comprising an actuator drive unit and therefore it is possible to construct an actuator drive unit simply. The third aspect of the present invention can be applied to vehicles such as a bulldozer and the like.

Also, to achieve the above-mentioned second object, a fourth aspect of the present invention is an operating lever unit which comprises an operating lever tiltably provided to a unit body, four pistons moving according to tilting motions of the operating lever, and displacement signal generating means for generating displacement signals of magnitudes corresponding to respective stroke positions of the four pistons, wherein:

restricting means is provided for restricting the tilting motion of the operating lever when two pistons adjacent to each other arriving at a maximum power position simultaneously by tilting operation of the operating lever;

the adjacent two pistons are provided to the unit body so as to move downward further by a predetermined amount after arriving at the maximum power position; and the displacement signal generating means generates a displacement signal of magnitude corresponding to the maximum power position, during movement of the adjacent two pistons from arriving at the maximum power position to moving downward further by the predetermined amount.

The fourth aspect of the present invention will be explained with reference to FIGS. 3,4, and 5.

According to the fourth aspect of the present invention, the mounting plate 11 of the unit body 7 is provided with restricting means 40. Thereupon, when the protruding tops of two pistons 1,4 which locate on two corners adjacent to each other in the four corners of the square simultaneously arrive at a position SF whereat the maximum power Ppmax is outputted by tilting operation of the operating lever 6, the tilting motion of operating lever 6 is restricted by the restricting means 40 (See FIGS. 3 and 4).

As shown in FIG. 4, the pistons 1,4, after the protruding tops thereof arrive at the position SF whereat the maximum power Ppmax is outputted, can move up to a stroke end position SFF whereat the pistons are further pushed down by a predetermined distance a.

Consequently, even though the movement of disk plate 8 is restricted by the restricting means 40 and the operating lever 6 arrives at the position SF whereat the maximum power Ppmax is outputted, the left and right pistons 1,4 themselves can move further from the position SF whereat the maximum power Ppmax is outputted up to the stroke end position SFF.

Thus, as shown in FIG. 3, the disk plate 8, with the operating lever 6, under the restricting means 40 serving as a supporting point, can rotate about X axis as shown by the arrow C. Accordingly, it is possible to obtain an operation feeling such as to shift it from a forward position F to a lateral direction. Besides, with respect to about Y axis perpendicular to X axis, the disk plate 8 can rotate, under the restricting means 40 serving as a supporting point. Therefore, it is possible to obtain an operation feeling such as to shift the tip end of operating lever 6 along a regular square (See FIG. 16(*b*)).

Under the restricting means 40 serving as a supporting point, when the operating lever 6 is shifted in a lateral direction (i.e. when the disk plate 8 is rotated), the pistons 1 to 4 move from the position SF whereat the maximum power Ppmax is outputted to the stroke end position SFF. At this time, as shown in FIG. 5, while the pistons arrive at the position SF whereat the maximum power Ppmax is outputted and further move downward by the predetermined distance a to arrive at the stroke end position SFF, the displacement signal Ppmax of magnitude corresponding to the position SF whereat the maximum power Ppmax is outputted is generated. Consequently, it is possible to shift the operating lever 6 in a lateral direction while keeping the condition wherein the operating lever unit 5 can outputs the displacement signal Ppmax which corresponds to the position SF whereat the maximum power Ppmax is outputted.

As described above, according to the fourth aspect of the present invention, even though the operating lever 6 pushes down two pistons 1,4 simultaneously, the lever operation feeling similar to that of the conventional art can be obtained. Further, the essential function of operating lever unit 5, which outputs the displacement signal Ppmax corresponding to the position SF whereat the maximum power Ppmax is outputted, is maintained. Besides, as shown in FIG. 6, the restricting means may comprise a guide 42. Also, the range of operation of the operation lever 6 can be freely defined by the restricting means.

Also, a fifth aspect of the present invention, with respect to the fourth aspect of the present invention, is characterized in that the restricting means is of pins which are mounted to the unit body or the operating lever so as to protrude therefrom.

The fifth aspect of the present invention will be explained with reference to FIGS. 3, 4, and 5.

According to the fifth aspect of the present invention, the mounting plate 11 of the unit body 7 is provided with pins 40. Thereupon, when the protruding tops of two pistons 1,4 which locate on two corners adjacent to each other in the four corners of the square simultaneously arrive at the position SF whereat the maximum power Ppmax is outputted by tilting operation of the operating lever 6, the tilting motion of operating lever 6 is restricted the pins 40 (See FIGS. 3 and 4).

Therefore, according to the fifth aspect of the present invention, as similar to the fourth aspect of the present invention, the operation feeling of the operating lever 6 which can be shifted in a lateral direction (along a square) as similar to the conventional art can be obtained, no matter what the operating lever 6 pushes down two pistons 1,4 simultaneously (See FIG. 16(*b*)). Also, the essential function of operating lever unit 5, which outputs the displacement signal Ppmax corresponding to the position SF whereat the maximum power Ppmax is outputted, is maintained (See FIG. 5). Further, since the pins 40 are only provided to the unit body 7 or the operating lever 6, the advantageous effect such that the unit is formed by a simple alternation, or addition of the construction can be obtained. Also, the range of operation of the operation lever 6 can be freely defined by changing the position of the pins 40.

Also, to achieve the above-mentioned third object, a sixth aspect of the present invention is a lever-operated actuator drive unit which comprises an operating lever tiltably provided to a lever unit body, four pistons moving according to tilting motions of the operating lever, displacement signal generating means for generating displacement signals of magnitudes corresponding to respective stroke positions of the four pistons, and two types of actuators drivenable in two drive directions of normal and reverse directions, and which drives the two types of actuators in drive directions corresponding to tilting directions of the operating lever, by amounts of drive corresponding to amounts of tilting motions of the operating lever, on the basis of the displacement signals generated by the displacement signal generating means, wherein:

restricting means is provided for restricting the tilting motion of the operating lever when two pistons adjacent to each other arrive at a maximum power position simultaneously by tilting operation of the operating lever;

the adjacent two pistons are provided to the lever unit body so as to move downward further by a predetermined distance after arriving at the maximum power position;

the displacement signal generating means generates a displacement signal of magnitude corresponding to the maximum power position, during movement of the adjacent two pistons from arriving at the maximum power position to moving downward further by the predetermined distance;

either of the two types of actuators and a drive direction thereof are corresponded to the respective four pistons; and when one of the four pistons in the displacement signal generating means generates a displacement signal, the actuator corresponding to the piston generating the displacement signal is driven in a corresponding direction by an amount of drive corresponding to the displacement signal.

The sixth aspect of the present invention is composed of the first and fourth aspects of the present invention, thereby producing the advantageous effect obtained by the first aspect and the advantageous effect obtained by the fourth aspect all together.

BRIEF DESCRIPTION OF THE DRAWINGS

The above and other objects and features of the present invention will be seen by reference to the description taken in connection with the accompanying drawings in which:

FIG. 7(*b*) is a perspective view of the universal joint shown in FIG. 7(*a*);

DESCRIPTION OF THE PREFERRED EMBODIMENTS

Hereinbelow, preferred embodiments of a lever-operated actuator drive unit and an operating lever unit of the present invention will be described with reference to the accompanying drawings. Besides, in the embodiments, it is supposed that an actuator drive unit and an operating lever unit are mounted on a vehicle and, the traveling of the vehicle is drive-controlled by operation of an operating lever.

Figure 7A:
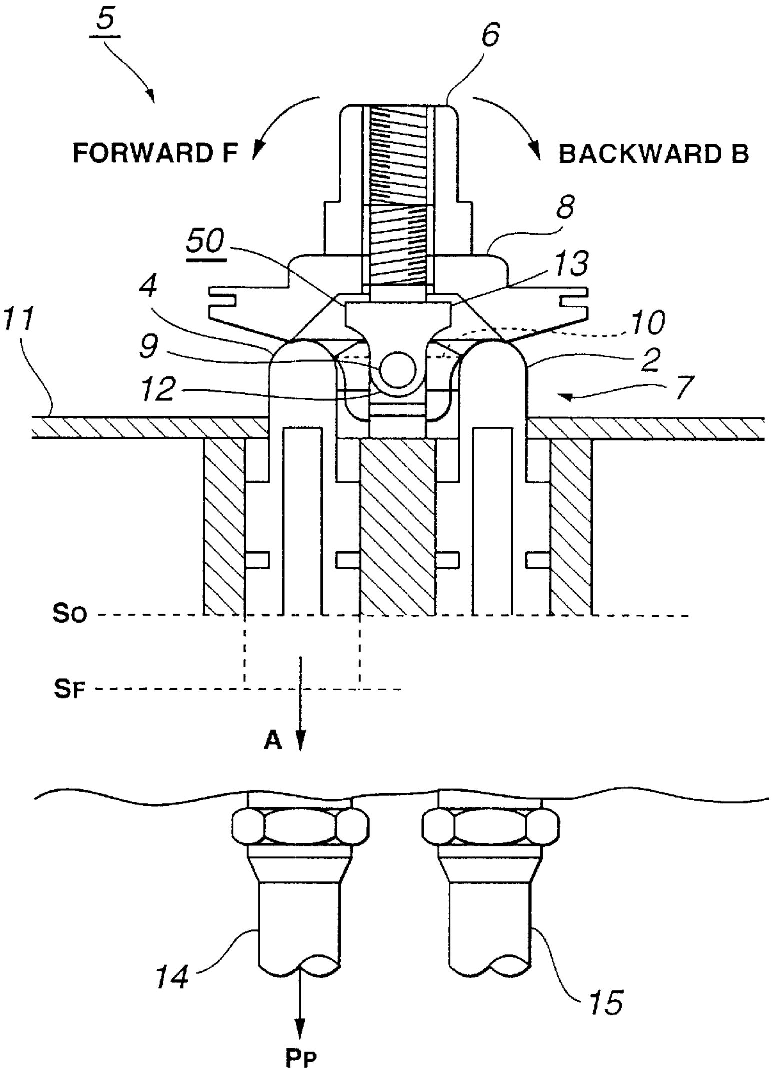
FIG.7(a) (PRIOR ART)
FIG. 7(*a*) is a sectional view of a conventional operating lever unit.
Figure 7B:
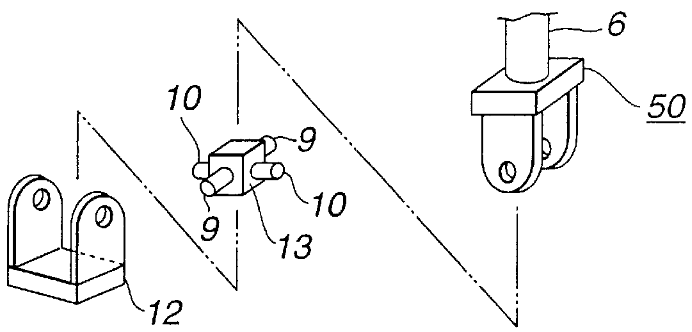
FIG.7(b) (PRIOR ART)

An operating lever unit 5 of the embodiment is formed as similar to the operating lever unit 5 shown in FIG. 7, as shown in FIG. 7(*a*), and is generally composed of an unit body 7 and an operating lever 6 which is tiltably provided to the unit body 7. The operating lever 6 is mounted to the unit body 7 via a universal joint 50 and a disk plate 8. Besides, the construction and the like of the universal joint 50 are similar to the conventional art above explained, so that the explanation thereof is omitted The operating lever unit 5 of the embodiment is different from the operating lever unit 5 shown in FIG. 7 in that the mounting angle of operating lever 6 to the mounting plate 11 of the unit body 7 is modified.

Figure 12A:
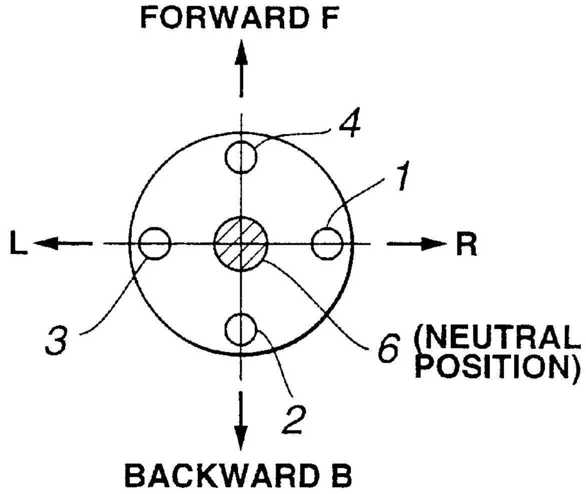
FIG.12(a) (PRIOR ART)
FIGS. 12(*a*) and 12(*b*) are diagrams explaining movements of the conventional operating lever.
Figure 12B:
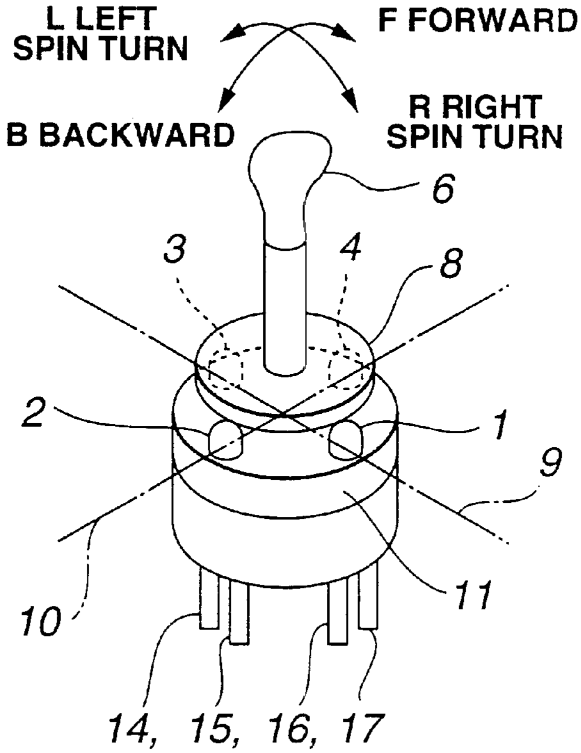
FIG.12(b) (PRIOR ART)
Figure 13:
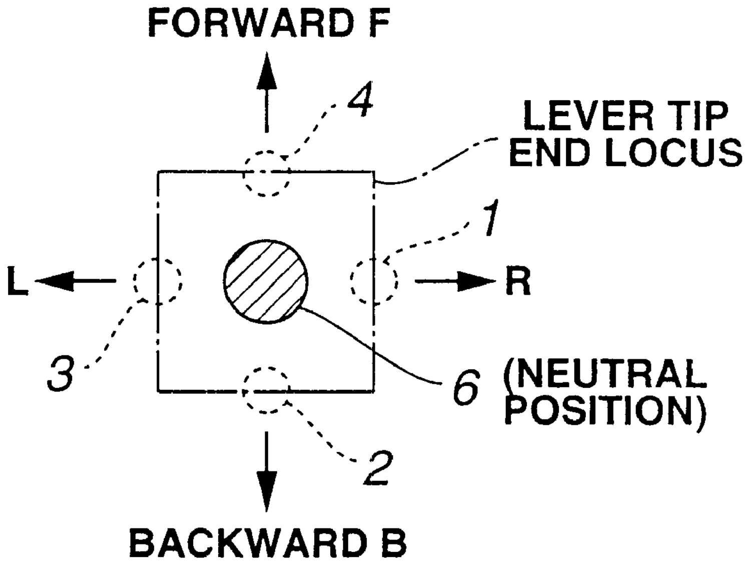
FIG.13 (PRIOR ART)
FIG. 13 is a diagram showing the locus of the tip end of conventional operating lever.
Figure 14:
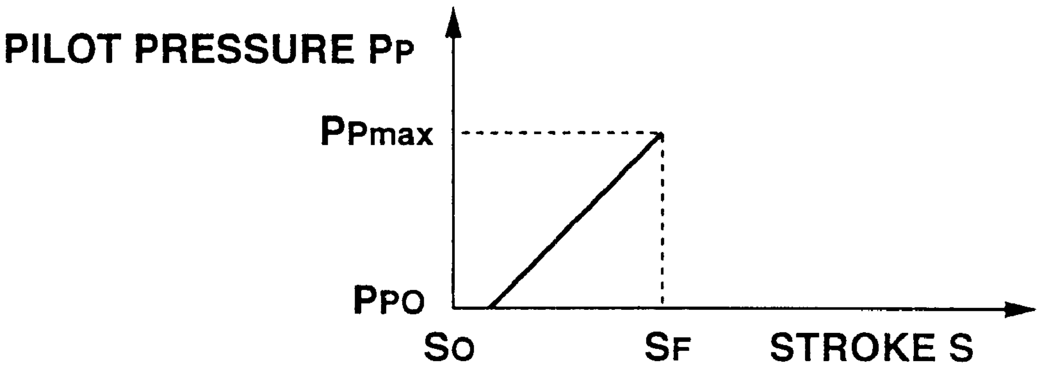
FIG.14 (PRIOR ART)
FIG. 14 is a diagram showing a relationship between a stroke of the conventional operating lever and an oil pressure signal.
Figure 15A:
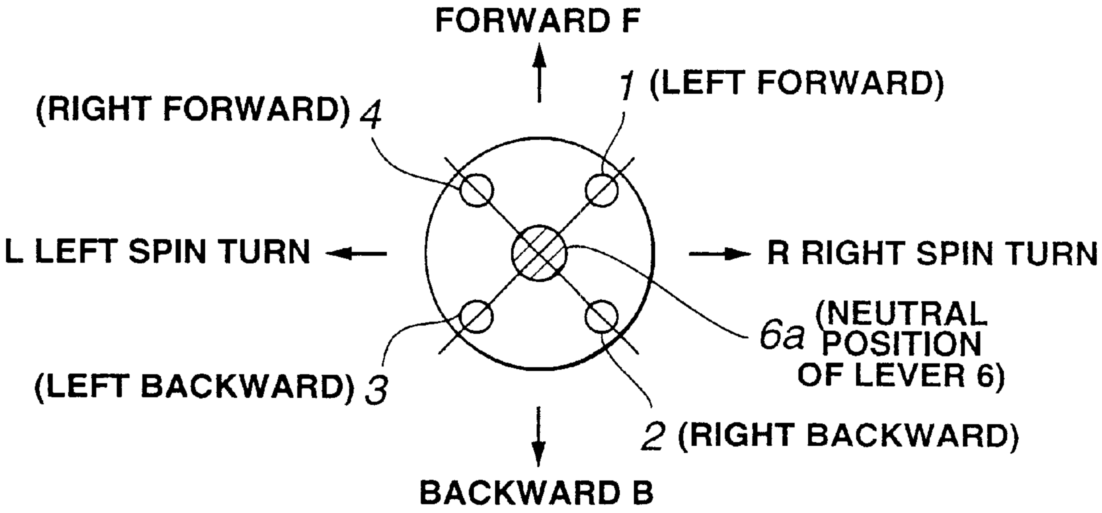
FIGS. 15(*a*) and 15(*b*) are diagrams explaining movements of the operating lever of the embodiment.
Figure 15B:
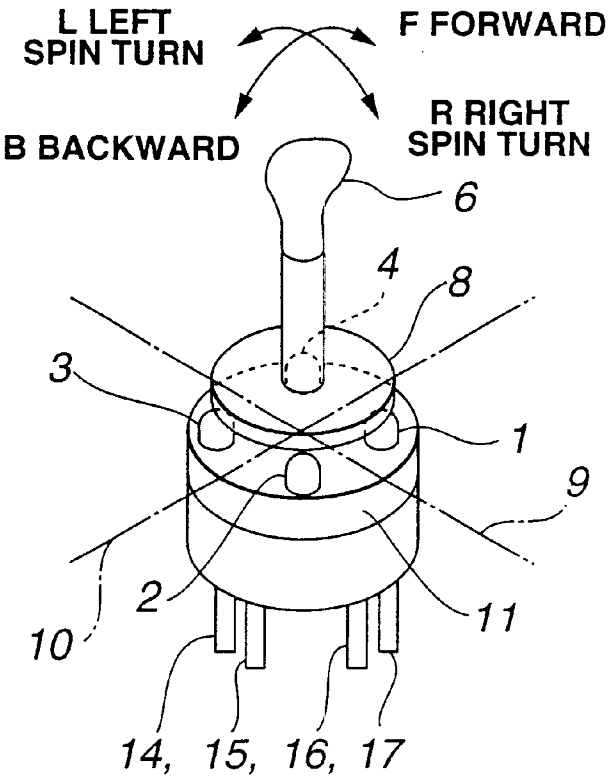

FIGS. 15(*a*) and 15(*b*) are diagrams corresponding to FIGS. 12(*a*) and 12(*b*) showing the conventional art.

That is, the operating lever 6 is mounted to the mounting plate 11 of the unit body 7 with a dislocated setting angle of 45°.

As shown in FIGS. 15(*a*) and 15(*b*), four pistons 1,2,3, and 4 are provided in such a way that the tops (upper ends) of pistons protrude beyond the mounting plate 11. The pistons 1,2,3, and 4 are arranged with dislocated 45° relative to supporting shafts 9 and 10, with viewed from a supporting point 6*a* of the operating lever. Besides, the square defined by the pistons 1,2,3, and 4 may not be a regular square. The piston 1 is arranged at the right above position. The piston 2 is arranged at the right below position. The piston 3 is arranged at the left below position. The piston 4 is arranged at the left above position.

The unit body 7 of the operating lever unit 5 is provided with an oil pressure signal generating means which generates oil pressure signals of magnitudes corresponding to displacements of pistons, at respective four pistons 1, 2, 3, and 4.

Figure 1A:
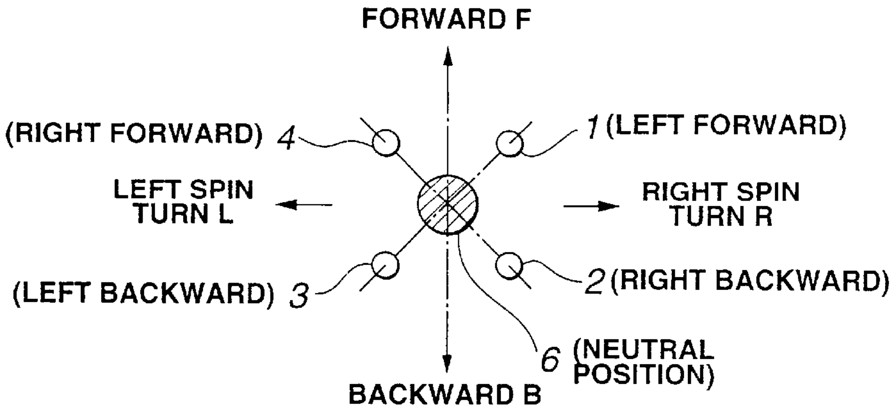
FIGS. 1(*a*) and 1(*b*) are diagrams showing a first embodiment of a lever-operated actuator drive unit of the present invention.
Figure 1B:
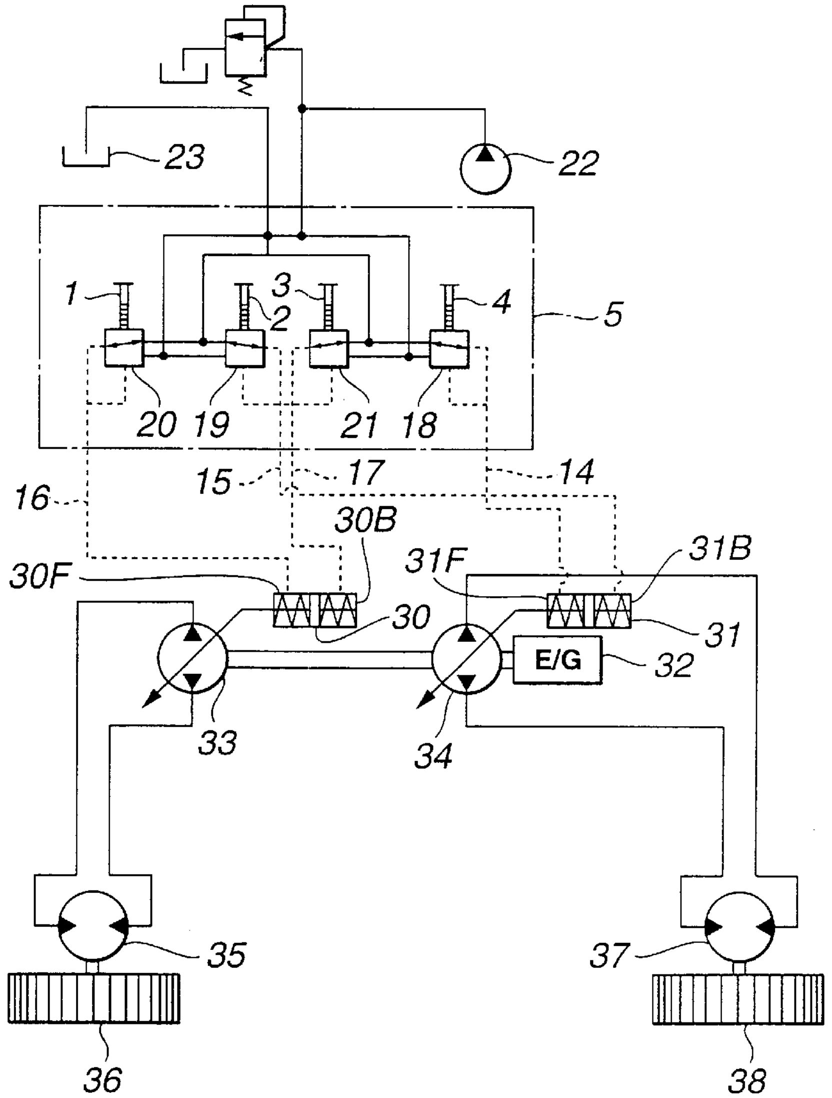

FIG. 1(*b*) shows a hydraulic circuit of the operating lever unit 5. Also, FIG. 1(*b*) shows a hydraulic circuit of the first embodiment of the hydraulic drive unit which is mounted on vehicles such as a skid steer loader and the like. FIG. 1(*a*) shows an arrangement of respective pistons 1, 2, 3, and 4 in the operating lever unit 5.

As shown in FIG. 1(*b*), the operating lever unit 5 is supplied with pilot pressurized oil from a fixed capacitive hydraulic pump 22. Also, the operating lever unit 5 is connected to a tank 23. The engine 32 drives the fixed capacitive hydraulic pump 22.

The pistons 1, 2, 3, and 4 are provided with pressure-reducing valves 20, 19, 21, and 18, through respective set springs. That is, when the pistons 1, 2, 3, and 4 are pushed down respectively, the spring force of set springs increases. Therefore, the setting pressure of the pressure-reducing valves 20, 19, 21, and 18 increases.

Inlet ports of the pressure reducing valves 20, 19, 21, and 18 are respectively connected to the fixed capacitive hydraulic pump 22 and the tank 23. Outlet ports of the pressure reducing valves 20, 19, 21, and 18 respectively communicate with pilot lines 16, 15, 17, and 14.

Next, the operation of the operating lever unit 5 will be explained

As shown in FIGS. 15(*a*) and 15(*b*), when the operating lever 6 is tilted from a neutral position about the axis of supporting shaft 9, the pistons 1 and 4 are pushed down via the disk plate 8.

The stroke S (displacement) of the pistons 1, 4 becomes a magnitude corresponding to the amount of tilting motion of the operating lever 6.

When the pistons 1, 4 are pushed down, in accordance with the stroke S, the spring force of set springs of the pressure-reducing valves 20, 18 increases.

That is, when the piston 1 is pushed down, the opening area of the pressure-reducing valve 20 becomes larger through the set spring and then, the pilot pressure is outputted to the pilot line 16. The pressure of pilot pressure outputted acts on the pressure-reducing valve 20 so as to reduce the opening area thereof. The pilot pressure compresses the set spring, so that the pressure-reducing valve 20 is balanced between the spring force and the pilot pressure. The spring force at the balanced position corresponds to the stroke S and the pilot pressure becomes pressure corresponding to the opening area. Therefore, the pilot pressure Pp which is outputted from the pilot line 16 becomes a magnitude corresponding to the amount of tilting motion of the operating lever 6.

Likewise, when the piston 4 is pushed down, the pilot pressure Pp which is outputted from the pilot line 14 becomes a magnitude corresponding to the amount of tilting motion of the operating lever 6.

Figure 5:
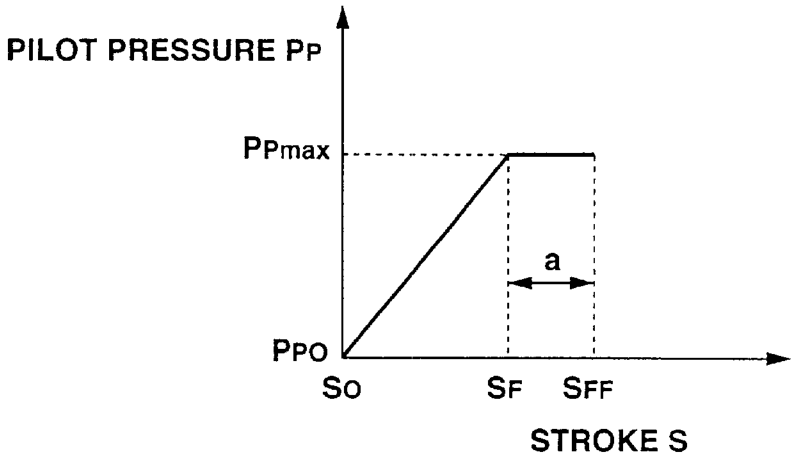
FIG. 5 is a diagram showing a relationship between a stroke of the operating lever and an ail pressure signal.

FIG. 5 shows a relationship between the stroke S of the operating lever 6 and the pilot pressure Pp. When the operating lever 6 is operated and the pistons 1, 4 move from the stroke position S0 corresponding to the neutral position to the position SF whereat the maximum power Ppmax is outputted, the pilot pressure Pp outputted from the pilot lines 16, 14 changes from the drain pressure Pp0 in the tank 23 up to the discharge pressure Ppmax in the fixed capacitive hydraulic pump 22. Thereupon, while the pistons arrive at the position SF whereat the maximum power Ppmax is outputted and further move downward by the predetermined amount a to arrive at the stroke end position SFF, the pilot lines 16, 14 output the pilot pressure Ppmax of magnitude corresponding to the position SF whereat the maximum power Ppmax is outputted.

The above-mentioned explanation is about the case that the pistons 1, 4 move according to tilting motion of the operating lever 6 and oil pressure signal representing the pilot pressure Pp is outputted from pilot lines 16, 14. It is also explained equally in case that the pistons 2 and 3 move respectively according to the tilting motion of the operating lever 6. The pilot lines 15, 17 output oil pressure signals representing the pilot pressure Pp.

Figure 3:
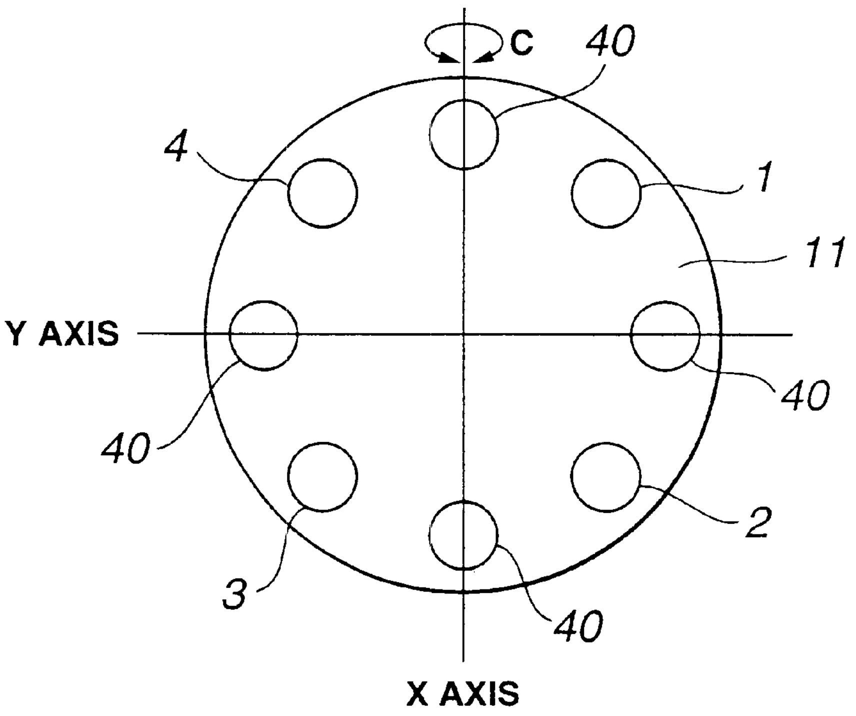
FIG. 3 is a plan view of an operating lever unit.
Figure 4:
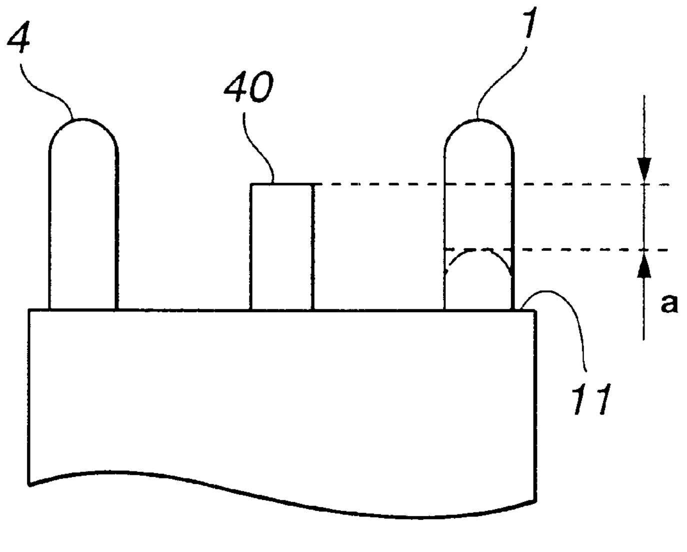
FIG. 4 is a side view of the operating lever unit shown in FIG. 3.

FIG. 3 is a plan view of the mounting plate 11 of the operating lever unit 5 of the embodiment. FIG. 4 is a side view of the operating lever unit 5 of the embodiment.

As shown in FIGS. 3 and 4, in the operating lever unit 5 of the embodiment, four pins 40 are provided at equal intervals so as to protrude beyond the mounting plate 11. The four pins 40 are arranged on the four corners of a regular square so as to locate the middle between two pistons adjacent to each other. The height of pins 40 is designed in such a way that when two pistons adjacent to the pins 40 among four pistons 1, 2, 3, and 4 simultaneously arrive at the position SF whereat the maximum power Ppmax is outputted, the disk plate 8 comes in contact with the pins 40.

Consequently, the pins 40 restrict the tilting motion of operating lever 6.

Further, after arriving at the position SF whereat the maximum power Ppmax is outputted, the pistons 1, 4 can further move downward by the predetermined amount a to arrive at the stroke end position SFF.

Consequently, no matter what the movement of disk plate 8 is restricted by the pins 40, the left and right pistons 1, 4 themselves can move from the position SF whereat the maximum power Ppmax is outputted up to the stroke end position SFF.

Figure 16A:
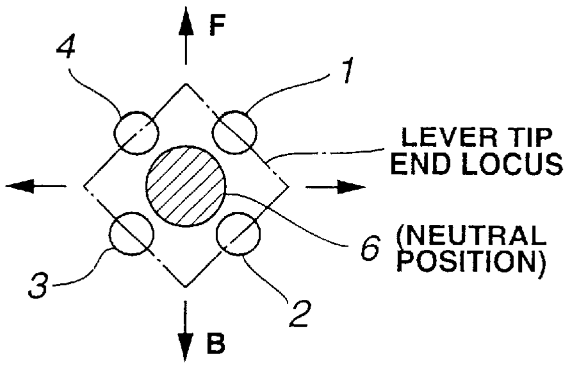
FIGS. 16(*a*) and 16(*b*) are diagrams showing locus of the tip end of operating lever.
Figure 16B:
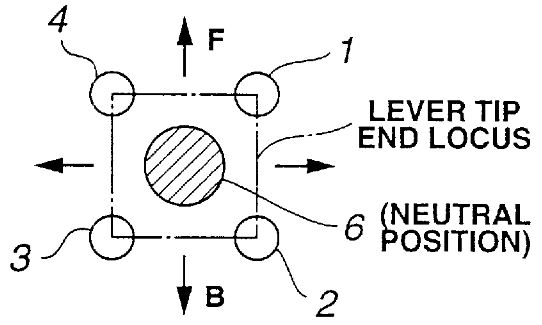
Figure 17A:
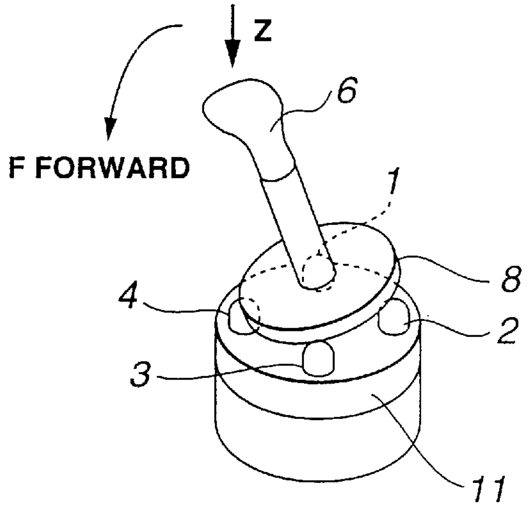
FIG.17(a) (PRIOR ART)
FIGS. 17(*a*) and 17*b*) are diagrams showing a situation wherein the conventional operating lever is at the stroke end position.
Figure 17B:
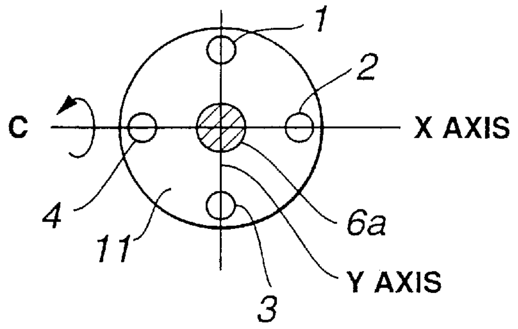
FIG.17(b) (PRIOR ART)
Figure 18A:
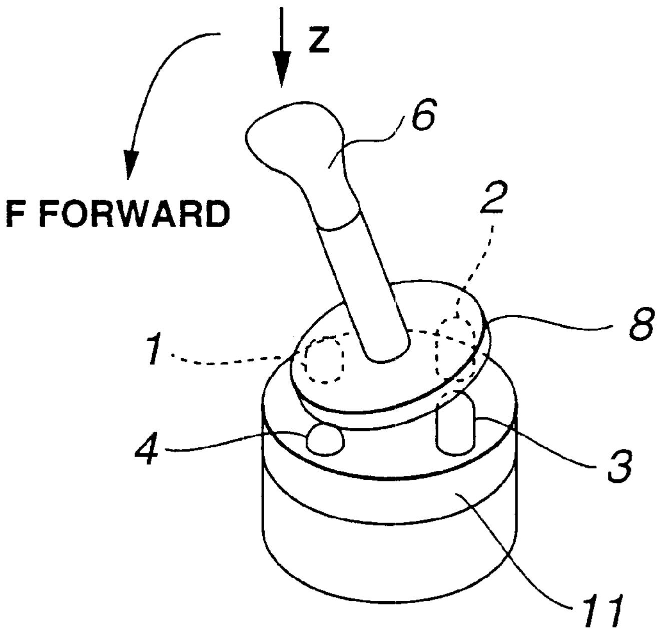
FIG.18(a) (PRIOR ART)
FIGS. 18(*a*) and 18(*b*) are diagrams showing a situation wherein the conventional operating lever is at a stroke end position.
Figure 18B:
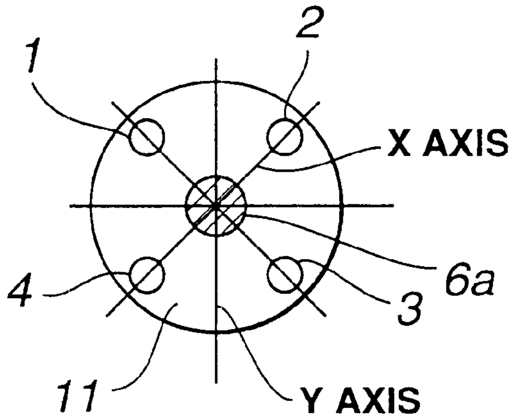
FIG.18(b) (PRIOR ART)

Therefore, as shown in FIG. 3, the disk plate 8 can rotate with the operating lever 6 about X axis as shown by the arrow C, under the pins 40 serving as a supporting point, as similar to the case in FIG. 17. Accordingly, the operator can obtain the operation feeling such as to be able to sift the operating lever 6 from a forward position F to a lateral direction. Besides, with respect to Y axis perpendicular to X axis, likewise, the operator can make it rotate under the pins 40 serving as a supporting point. Therefore, as shown in FIG. 16(*b*), the operator can obtain the operation feeling such as to shift the tip end of operating lever 6 (the knob of operating lever 6) along a regular square, as like the operating lever unit 5 without modification of the setting angle of lever.

Also, under the pins 40 serving as a supporting point, when the operating lever 6 is shifted in the lateral direction (i.e. the disk plate 8 rotates), the pistons 1 to 4 move from the position SF whereat the maximum power Ppmax is outputted to the stroke end position SFF. At this time, as shown in FIG. 5, the operating lever unit 5 outputs an oil pressure signal Ppmax of magnitude identical with the magnitude corresponding to the position SF whereat the maximum power Ppmax is outputted, while its pistons arrive at the position SF whereat the maximum power Ppmax is outputted and further move downward by the predetermined distance a to arrive at the stroke end position SFF. Accordingly, it is possible to shift the operating lever 6 in the lateral direction, while keeping the condition wherein the operating lever unit 5 outputs the displacement signal Ppmax corresponding to the position SF whereat the maximum power Ppmax is outputted. Besides, in ordinary case, the predetermined amount a is set to a sufficient amount so that the operation range of the operating lever 6 becomes square.

As described above, according to the operating lever unit 5 of the embodiment, no matter what the operating lever 6 simultaneously pushes down two pistons 1, and 4, as similar to the conventional art, it is possible to obtain the lever operation feeling such that the tip end of lever moves in the lateral direction. Also, at this time, the essential function of the operating lever unit 5, which outputs the displacement signal Ppmax corresponding to the position SF whereat the maximum power Ppmax is outputted, is maintained.

Further, since the pins 40 are only provided to the mounting plate 11 of the unit body 7, the advantageous effect such that the unit is formed by a simple modification or addition of the construction can be obtained.

Besides, in the embodiment shown in FIGS. 3 and 4, the pins 40 are provided at the side of the unit body 7. However, the similar pin members may be provided at the side of the disk plate 8. For example, in case the pins are provided so as to protrude from the under surface of disk plate 8, a function like that of the embodiment shown in FIGS. 3 and 4 can be obtained.

Figure 6:
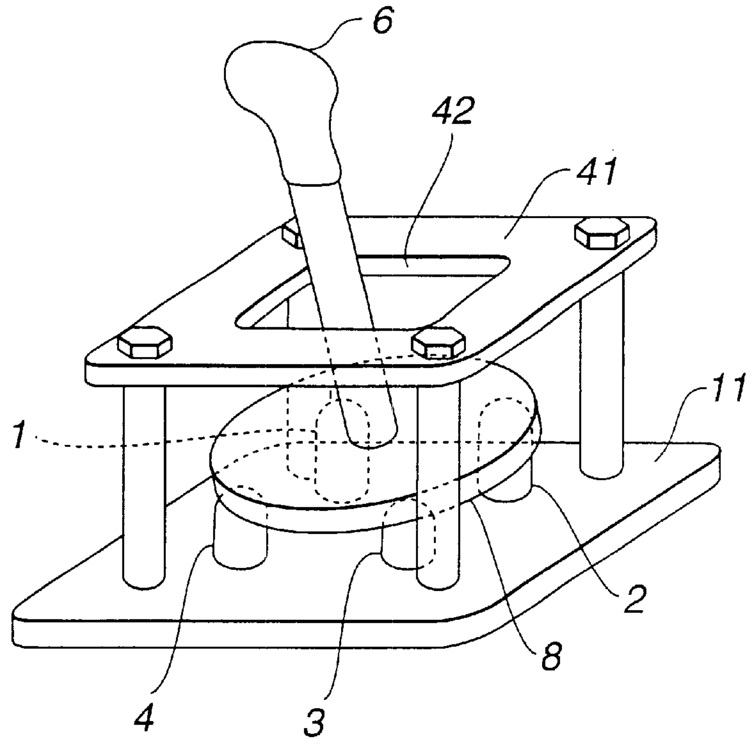
FIG. 6 is a perspective view of an embodiment of the operating lever unit.

Also, as shown in FIG. 6, instead of the pins 40, a guide 41 may be provided and likewise restricts the tilting motion of operating lever 6.

In the operating lever unit 5, the guide 41 that restricts the tilting motion of the operating lever 6 is mounted to the mounting plate 11 so as to come in contact with the lever shaft between the knob of operating lever 6 and the disk plate 8. The guide 41 is provided with a square guide opening 42. Therefore, the operating lever 6 is tilted in the forward direction F and then the operating lever 6 with the tilting motion thereof restricted is shifted along the edge of guide opening 42, whereby the operation feeling such as to shift the lever top in the lateral direction can be obtained.

As described above, with respect to the operating lever unit 5 shown in FIG. 6, as similar to the operating lever unit 5 shown in FIGS. 3 and 4, it is possible to obtain the operation feeling such as to shift the lever top along a square. At the same time, also the essential function of the operating lever unit 5, which outputs the displacement signal Ppmax corresponding to the position SF whereat the maximum power Ppmax is outputted, is maintained.

The above-mentioned contents are about the operating lever unit 5 of the embodiment. Next, the case that the traveling of a vehicle is controlled by operation of the operating lever 6 will be now explained.

As shown in FIG. 1(*b*), the vehicle is provided with a left endless track 36 and a right endless track 38, at left and right sides of the body thereof. Besides, the present invention can be applied to a vehicle having wheels, instead of the endless tracks. With respect to the vehicle having wheels, the hydraulic motors for traveling are changed to steeling motors, and the wheels are driven through gears and chains.

The left endless track 36 and the right endless track 38 work by driven of the hydraulic motor 35 for left traveling and the hydraulic motor 37 for right traveling. That is, the hydraulic motor 35 for left traveling is an actuator which drives the left endless track 36 in two directions of the forward and backward. The hydraulic motor 37 for right traveling is an actuator which drives the right endless track 38 in two directions of the forward and backward. Besides, the left and right hydraulic motors 35,37 have the same pushing away volume.

The operating lever unit 5 is connected to respective swash plate-controlling cylinders 30, 31 of the left and right variable capacitive hydraulic pumps 33, 34 through oil pressure lines. Further, the left and right variable capacitive hydraulic pumps 33,34 are connected to respective left and right traveling hydraulic motors 35, 37 through oil pressure lines. Besides, the left and right variable capacitive hydraulic pumps 33,34 have the same pushing away volume.

The variable capacitive hydraulic pumps 33, 34 and the fixed capacitive hydraulic pump 22 are driven by the engine 32.

Also, as shown in FIG. 1(*a*), the forward direction of the left traveling hydraulic motor 35 is corresponded to the piston 1 arranged at the right above position. Also, the backward direction of the right traveling hydraulic motor 37 is corresponded to the piston 2 arranged at the right below position. Further, the backward direction of the left traveling hydraulic motor 35 is corresponded to the piston 3 arranged at the left below position. Furthermore, the forward direction of the right traveling hydraulic motor 37 is corresponded to the piston 4 arranged at the left above position.

To put it concretely, the pilot line 16 is connected to the cylinder chamber 30F of the swash plate-controlling cylinder 30. Also, the pilot line 15 is connected to the cylinder chamber 31B of the swash plate-controlling cylinder 31. Further, the pilot line 17 is connected to the cylinder chamber 30B of the swash plate-controlling cylinder 30. Furthermore, the pilot line 14 is connected to the cylinder chamber 31F of the swash plate-controlling cylinder 31.

Accordingly, at the pressure-reducing valves 20, 19, 21, and 18, one of four pistons 1, 2, 3, and 4 generates a displacement signal, and then the traveling hydraulic motor that corresponds to the piston generating the displacement signal is driven in the corresponding running direction, by the amount of drive corresponding to the displacement signal.

Therefore, on the basis of oil pressure signal Pp generated by the operating lever unit 5, the left and right traveling hydraulic motors 35, 37 are driven in the rotating direction corresponding to the tilting direction of the operating lever 6, and driven at a speed corresponding to the amount of tilting motion of the operating lever 6, whereby the left and right endless track 36, 38 can be driven respectively.

Figure 10:
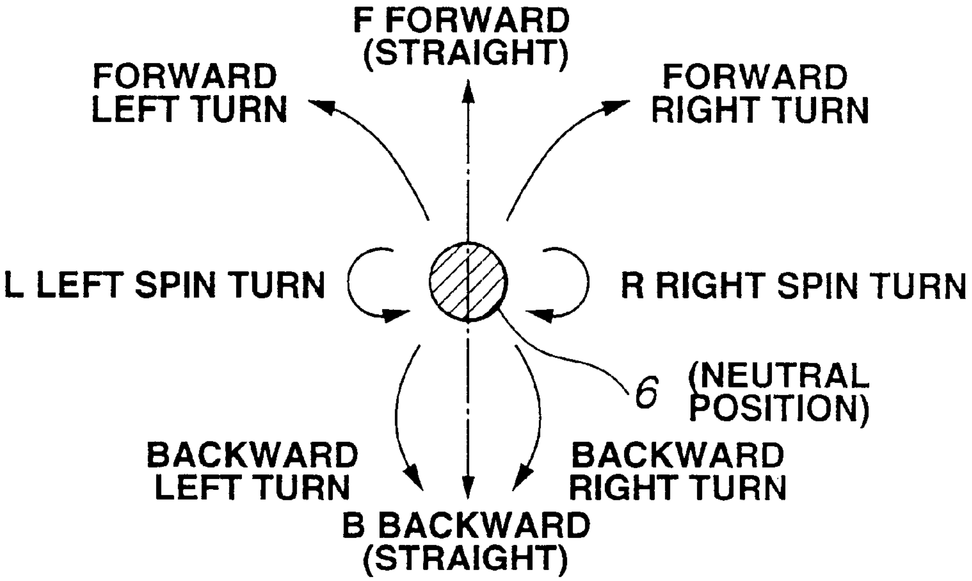
FIG. 10 is a diagram explaining movements of vehicles such as a skid steer loader and the like in accordance with tilting directions of the operating lever.

FIG. 10 is a diagram explaining the movement of vehicle on which the hydraulic circuit shown in FIG. 1(*b*) is mounted, in accordance with tilting directions of the operating lever 6. The diagram shows an operation pattern of vehicles such as a skid steer loader and the like. Hereinafter, the operation of hydraulic circuit shown in FIG. 1(*b*) will be now explained with reference to FIG. 10.

Now, as shown in FIG. 10, it is assumed that the operating lever 6 has been tilted in the forward direction F from the neutral position.

Under the situation, when the pistons 1, 4 of the operating lever unit 5 move by the same stroke, the pilot lines 16, 14 output oil pressure signals Pp pilot oil pressures), magnitudes of which are equal to each other. The oil pressure signal Pp (pilot oil pressure) outputted from the pilot line 16 is supplied to the cylinder chamber 30F corresponding to the left forward traveling of the swash plate-controlling cylinder 30. Also, the oil pressure signal Pp (pilot oil pressure) outputted from the pilot line 14 is supplied to the cylinder chamber 31F corresponding to the right forward traveling of the swash plate-controlling cylinder 31.

Therefore, the swash plate of the left traveling hydraulic pump 33 is changed to the tilt-rotating angle corresponding to forward traveling, and the pressurized oil discharged from the left traveling hydraulic pump 33 flows into the inflow port corresponding to the forward traveling side of the left traveling hydraulic motor 35. The swash plate of the right traveling hydraulic pump 34 is changed to the tilt-rotating angle corresponding to the forward traveling, and the pressurized oil discharged from the right traveling hydraulic pump 34 flows into the inflow port corresponding to the forward traveling side of the right traveling hydraulic motor 37.

Thus, the left and right endless tracks 36, 38 operate in the forward direction, whereby the vehicle travels forward (goes straight on) as shown by the arrow in FIG. 10. Besides, the speed of vehicle becomes the magnitude corresponding to the amount of tilting motion of the operating lever 6.

In FIG. 10, when the operating lever 6 tilted in the backward direction B, in the right spin-turn (namely the right turning without movement of the center of vehicle) direction R, in the left spin-turn (namely the left turning without movement of the center of vehicle) direction L, in the middle direction between the direction F and the direction R, in the middle direction between the direction R and the direction B, in the middle direction between the direction B and the direction L, or in the middle direction between the direction L and the direction F, the vehicle travels in like manner.

When the operating lever 6 is tilted in the direction B, the pistons 2 and 4 are pushed down. Also, when the operating lever 6 is tilted in the direction R, the pistons 1 and 2 are pushed down. Further, when the operating lever 6 is tilted in the direction L, the pistons 3 and 4 are pushed down. When the operating lever 6 is tilted in the middle direction between the direction F and the direction R, only the piston 1 is pushed down. Also, when the operating lever 6 is tilted in the middle direction between the direction R and the direction B, only the piston 2 is pushed down. Further, when the operating lever 6 is tilted in the middle direction between the direction B and the direction L, only the piston 3 is pushed down. Furthermore, when the operating lever 6 is tilted in the middle direction between the direction L and the direction F, only the piston 4 is pushed down.

When only the piston 1 is pushed down to generate an oil pressure signal Pp, only the left traveling hydraulic motor 35, which corresponds to the piston 1 generating the oil pressure signal Pp, is driven in the corresponding forward direction by the amount of drive corresponding to the oil pressure signal Pp. Also, when only the piston 2 is pushed down to generate an oil pressure signal Pp, only the right traveling hydraulic motor 37, which corresponds to the piston 2 generating the oil pressure signal Pp, is driven in the corresponding backward direction by the amount of drive corresponding to the oil pressure signal Pp. Further, when only the piston 3 is pushed down to generate an oil pressure signal Pp, only the left traveling hydraulic motor 35, which corresponds to the piston 3 generating the oil pressure signal Pp, is driven in the corresponding backward direction by the amount of drive corresponding to the oil pressure signal Pp. Furthermore, when only the piston 4 is pushed down to generate an oil pressure signal Pp, only the right traveling hydraulic motor 37, which corresponds to the piston 4 generating the oil pressure signal Pp, is driven in the corresponding forward direction by the amount of drive corresponding to the oil pressure signal Pp.

Thus, when the operating lever 6 is tilted in the backward direction B, as shown by the arrow in FIG. 10, the vehicle travels backward (or goes straight on). Also, when the operating lever 6 is tilted in the right spin-turn (namely the right turning without movement of the center of vehicle) direction R, the cylinder chamber 30F of the swash plate-controlling cylinder 30 and the cylinder chamber 31B of the swash plate-controlling cylinder 31 are supplied with the same pressure whereby the hydraulic motors 35 and 37 rotate at the same speed in respective directions opposite to each other. That is, the vehicle turns in the right direction (does the right turning without movement of the center of vehicle). Also, the operating lever 6 is tilted in the left spin-turn (namely the left turning without movement of the center of vehicle) direction L, as similar to the tilting motion in the direction R, the vehicle turns in the left direction (does the left turning without movement of the center of vehicle). Further, in accordance with tilting motion of the operating lever 6 in the middle direction between the direction F and the direction R, the vehicle turns in the right direction while traveling forward. Also, in accordance with tilting motion of the operating lever 6 in the middle direction between the direction R and the direction B, the vehicle turns in the right direction while traveling backward. Also, in accordance with tilting motion of the operating lever 6 in the middle direction between the direction B and the direction L, the vehicle turns in the left direction while traveling backward. Also, in accordance with tilting motion of the operating lever 6 in the middle direction between the direction L and the direction F, the vehicle turns in the left direction while traveling forward. Herein, the motion such that only the piston 1 is pushed down and the vehicle turns is particularly called a pivot-turn. The pivot-turn means that the vehicle turns under condition wherein only one hydraulic motor is driven and the other hydraulic motor is stationary.

Figure 8:
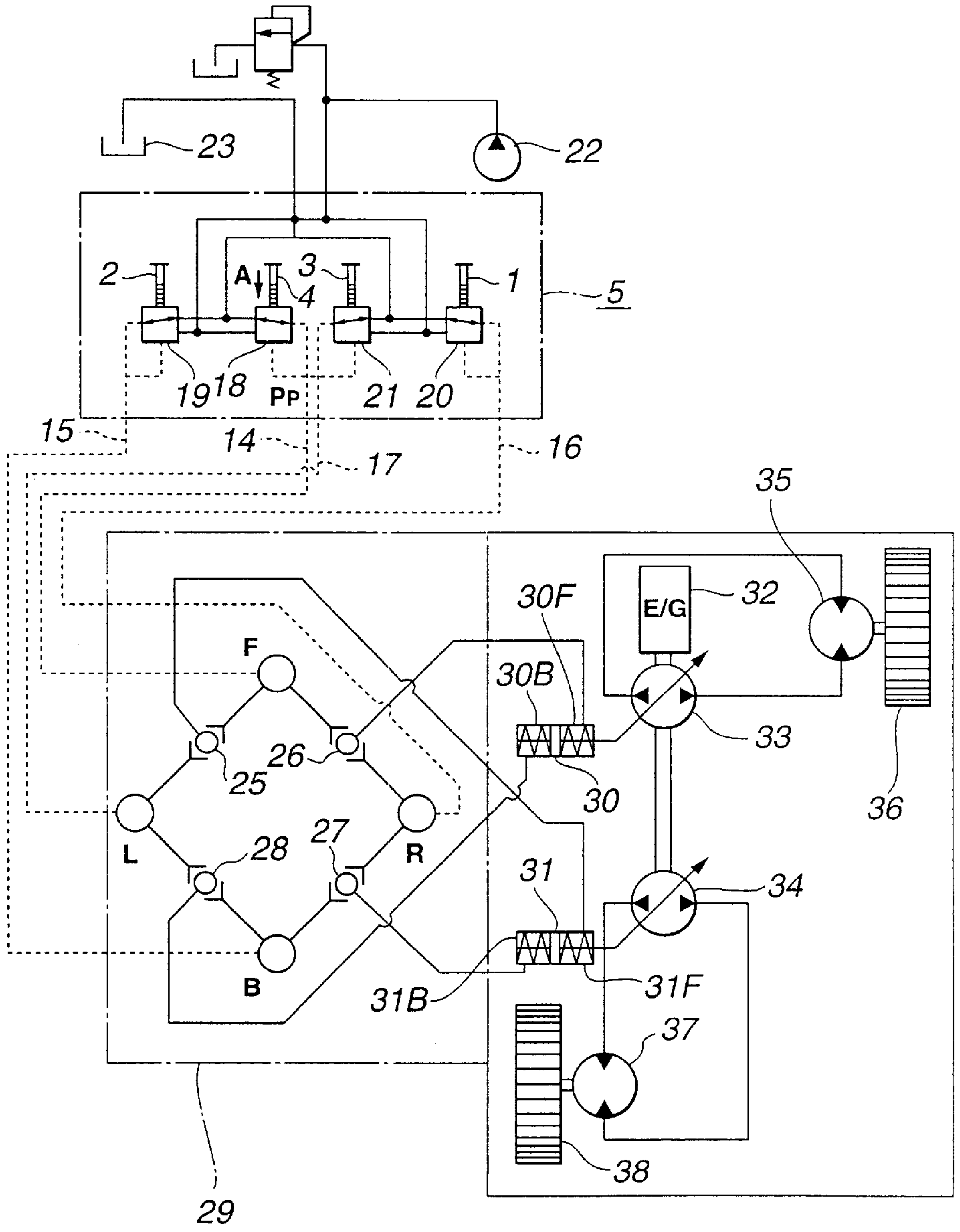
FIG.8 (PRIOR ART)
FIG. 8 is a diagram of the hydraulic circuit of the conventional actuator drive unit.
Figure 9:
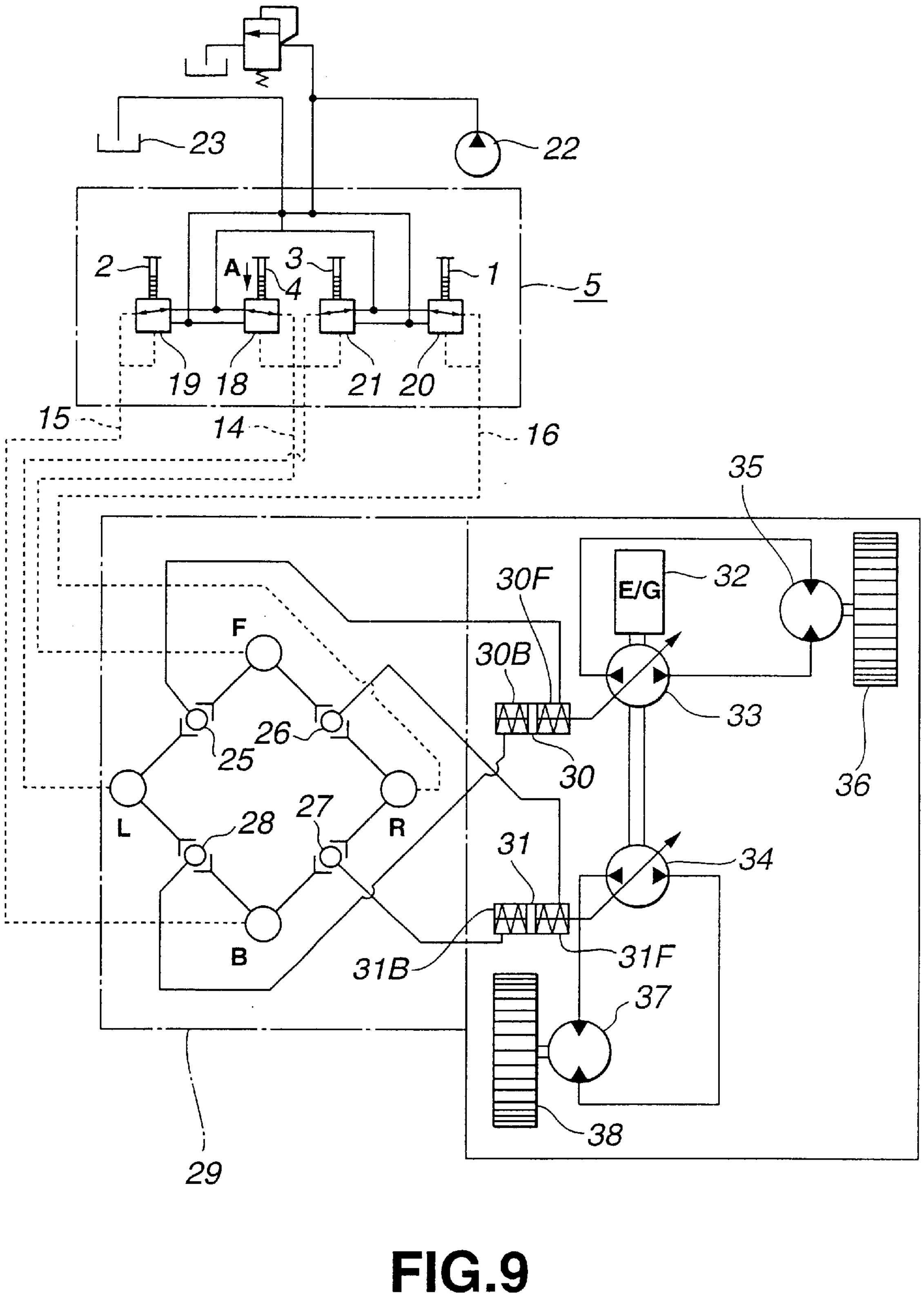
FIG.9 (PRIOR ART)
FIG. 9 is a diagram of the hydraulic circuit of the conventional actuator drive unit.

As described above, according to the embodiment, it is formed in such a way that oil pressure signals outputted from the pilot lines 16, 15, 17, and 14 of the operating lever unit 5, as drive signals, are directly fed into corresponding cylinder chambers of the swash plate-controlling cylinders 30, 31. Therefore, the drive signal generating circuit 29, which is indispensable on the conventional hydraulic drive unit shown in FIGS. 8 and 9, becomes needless.

Figure 2A:
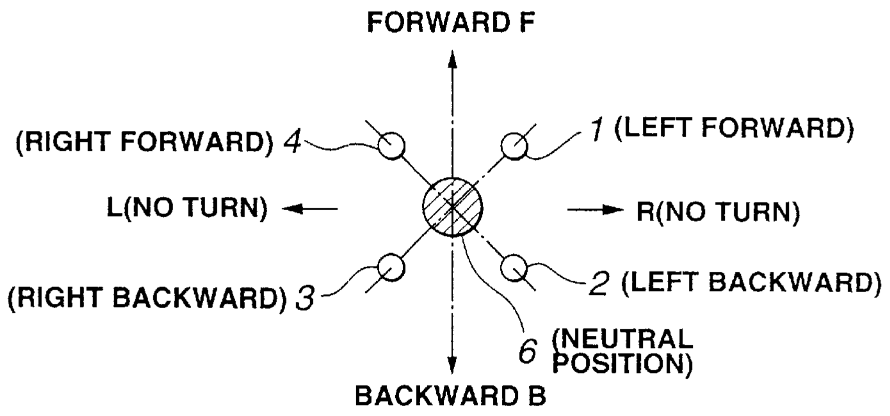
FIGS. 2(*a*) and 2(*b*) are diagrams showing a second embodiment of a lever-operated actuator drive unit of the present invention.
Figure 2B:
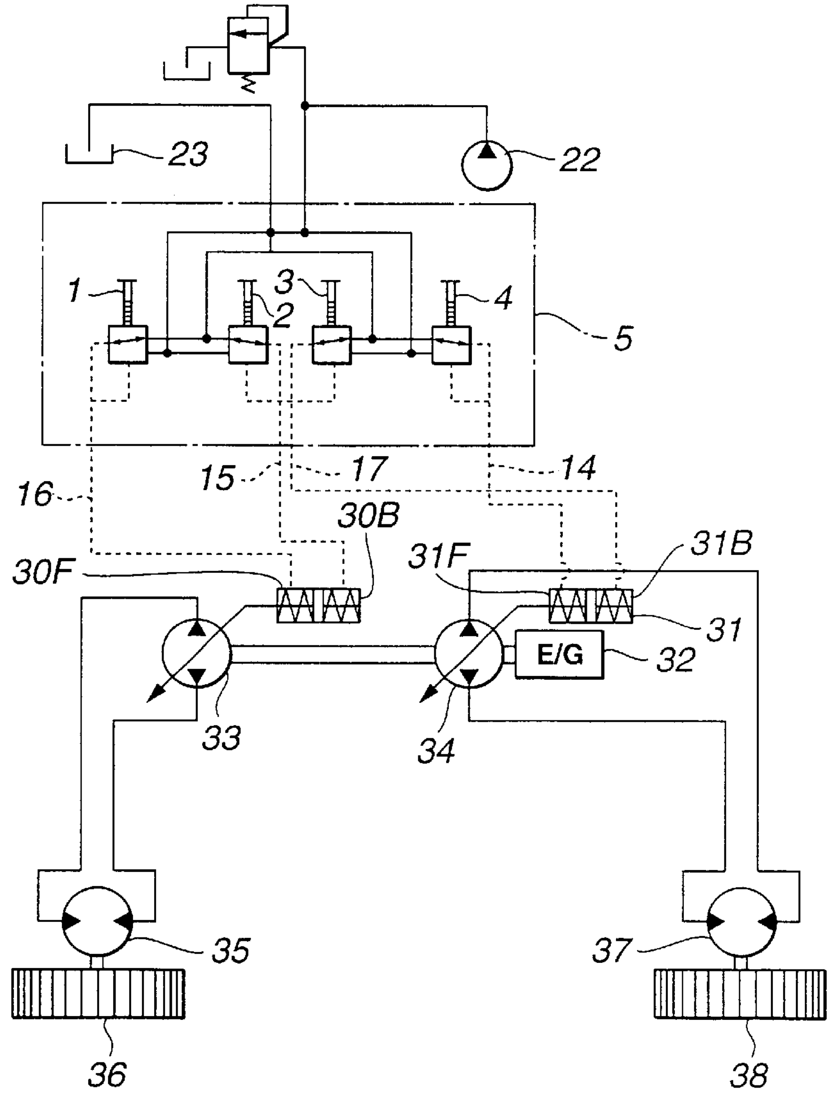

For this reason, it is possible to reduce the number of parts comprising a hydraulic drive unit and therefore it is possible to form a hydraulic drive unit simply FIG. 2(*b*) shows a hydraulic circuit of a second embodiment of the hydraulic drive unit which is mounted on vehicles such as a bulldozer and the like. FIG. 2(*a*) shows an arrangement of respective pistons 1,2,3,4 of the operating lever unit 5.

In FIG. 2, elements that are identical with corresponding elements in FIG. 1 are given the same reference numbers and therefore the explanation about those elements is omitted. The operation pattern by the operating lever 6 about vehicles such as bulldozer and the like is different from that about vehicles such as skid steer loader and the like. For this reason, the configuration which connects the pilot lines 16, 15, 17, 14 of the operating lever unit 5 to the cylinder chambers of the swash plate-controlling cylinders 30, 31 about the former vehicles is different in part from that about the latter. The operation pattern is shown in FIG. 11.

That is, with difference from the hydraulic circuit shown in FIG. 1(*b*), in the hydraulic circuit shown in FIG. 2(*b*), the pilot line 15 is connected to the cylinder chamber 30B of the swash plate-controlling cylinder 30 and, the pilot line 17 is connected to the cylinder chamber 31B of the swash plate-controlling cylinder 31.

Figure 11:
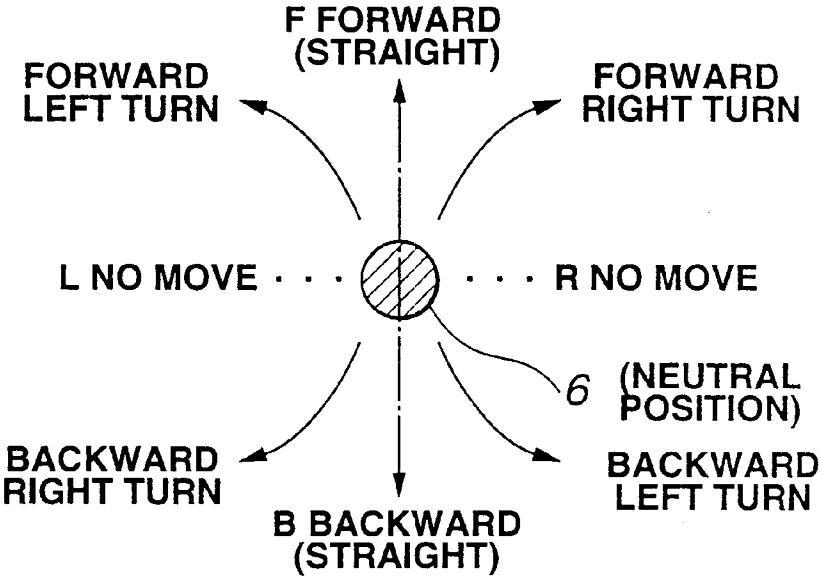
FIG. 11 is a diagram explaining movements of vehicles such as a bulldozer and the like in accordance with tilting directions of the operating lever.

Accordingly, the operating lever 6 is tilted in the forward direction F and the pistons 1, 4 are pushed down, whereby the vehicle travels forward (or goes straight on) as shown by the arrow in FIG. 11. When the operating lever 6 is tilted in the backward direction B and the pistons 2, 3 are pushed down, the vehicle travels backward (or goes straight on astern). Also, when the operating lever 6 is tilted in the right direction R and the pistons 1, 2 are pushed down, cylinder chambers 30F and 30B of the swash plate-controlling cylinder 30 are supplied with the same pressure, so that the swash plate of the hydraulic pump 33 locates at the neutral position. Thereupon, the vehicle stops. When the operating lever 6 is tilted in the right direction L and the pistons 3,4 are pushed down, as similar to the case of tilted in the direction R, the vehicle stops. Also, when the operating lever 6 is tilted in the middle direction between the direction F and the direction R and only the piston 1 is pushed down, the vehicle turns in the right direction while traveling forward. When the operating lever 6 is tilted in the middle direction between the direction R and the direction B and only the piston 2 is pushed down, the vehicle turns in the left direction while traveling backward. Further, when the operating lever 6 is tilted in the middle direction between the direction B and the direction L and only the piston 3 is pushed down, the vehicle turns in the right direction while traveling backward. Furthermore, when the operating lever 6 is tilted in the middle direction between the direction L and the direction F and only the piston 4 is pushed down, the vehicle turns in the left direction while traveling forward.

It should also be understood that the foregoing relates to only preferred embodiments of the present invention, and that it is intended to cover all changes and modifications of the present invention herein chosen for the purposes of the disclosure, which do not constitute departures from the spirit and scope of the present invention.

What is claimed is:

1. A lever-operated actuator drive unit comprising:

an operating lever;

four pistons respectively arranged at a right above position, a right below position, a left below position and a left above position, the pistons moving relative to tilting direction and amount of tilting motion of the operating lever;

displacement signal generating means for generating displacement signals in magnitudes corresponding to movement of the four pistons;

right and left traveling actuators corresponding to the four pistons and respectively receiving the displacement signals from the displacement signal generation means, and the right and left actuators respectively moving in forward and backward directions corresponding to the tilting direction of the operating lever and in amounts corresponding to the amount of tilting motion of the operating lever on the basis of the displacement signals generated by the displacement signal generating means;

a forward direction of the left traveling actuator corresponding to the piston arranged at the right above position, a backward direction of the right traveling actuator corresponding to the piston arranged at the right below position, a backward direction of the left traveling actuator corresponding to the piston arranged at the left below position, and a forward direction of the right traveling actuator corresponding to the piston arranged at the left above position; and when one of the four pistons is moved, the displacement signal generating means generates a displacement signal and one of the right and left traveling actuators corresponding to the displaced piston moves in a direction and in an amount corresponding to the displacement signal being generated.

2. An operating lever unit comprising:

an operating lever tiltably provided to a unit body;

four pistons moving relative to tilting motions of the operating lever;

restricting means for restricting the tilting motion of the operative lever when two adjacent pistons of the four pistons arrive at a maximum power position simultaneously by a tilting operation of the operative lever;

the adjacent two pistons being arranged on the unit body so as to move further downward by a predetermined amount after arriving at the maximum power position; and displacement signal generating means for generating displacement signals in magnitudes corresponding to respective stroke positions of the four pistons; the displacement signal generating means generating a displacement signal of a magnitude corresponding to the maximum power position, when the adjacent two pistons move further downward from the maximum power position by the predetermined amount.

3. The operating lever unit of claim 2, wherein the restricting means includes pins mounted to the unit body or the operating lever so as to protrude therefrom.

4. A lever-operated actuator drive unit comprising:

an operating lever tiltably provided to a unit body;

four pistons moving according to tilting motions of the operating lever;

two actuators corresponding to the four pistons and respectively receiving displacement signals from displacement signal generating means, and the two actuators respectively moving in forward and backward directions corresponding to the tilting directions of the operating lever and in amounts corresponding to the amount of tilting motion of the operating lever on the basis of the displacement signals generated by the displacement signal generating means; and restricting means for restricting the tilting motion of the operative lever when two adjacent pistons of the four pistons arrive at a maximum power position simultaneously by a tilting operation of the operative lever; the adjacent two pistons being arranged on the unit body so as to move further downward by a predetermined amount after arriving at the maximum power position; and the displacement signal generating means for generating the displacement signals in magnitudes corresponding to respective stroke positions of the four pistons; the displacement signal generating means generating a displacement signal of a magnitude corresponding to the maximum power position, when the adjacent two pistons move further downward from the maximum power position by the predetermined amount; and when one of the four pistons is moved, the displacement signal generating means generates a displacement signal and one of the two actuators corresponding to the displaced piston moves in a direction and in an amount corresponding to the displacement signal being generated.

* * * * *